(12) United States Patent
Yu

(10) Patent No.: US 10,133,393 B2
(45) Date of Patent: Nov. 20, 2018

(54) METHOD FOR CONTROLLING SECURITY AND ELECTRONIC DEVICE THEREOF

(71) Applicant: Samsung Electronics Co., Ltd., Suwon-si, Gyeonggi-do (KR)

(72) Inventor: Danlei Yu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 161 days.

(21) Appl. No.: 14/886,456

(22) Filed: Oct. 19, 2015

(65) Prior Publication Data

US 2016/0110013 A1    Apr. 21, 2016

(30) Foreign Application Priority Data

Oct. 20, 2014   (KR) ........................ 10-2014-0141871

(51) Int. Cl.
*G06F 3/041* (2006.01)
*G06F 3/01* (2006.01)
*G06F 21/46* (2013.01)
*G06F 3/0488* (2013.01)
*G06F 21/36* (2013.01)

(52) U.S. Cl.
CPC ............ *G06F 3/0416* (2013.01); *G06F 3/016* (2013.01); *G06F 3/0412* (2013.01); *G06F 3/04883* (2013.01); *G06F 3/04886* (2013.01); *G06F 21/36* (2013.01); *G06F 21/46* (2013.01); *G06F 2203/04104* (2013.01); *G06F 2203/04808* (2013.01)

(58) Field of Classification Search
CPC ...... G06F 3/0416; G06F 3/0412; G06F 3/016; G06F 21/46; G06F 3/04886; G06F 2203/04104; G06F 21/36; G06F 2203/04808; G06F 3/04883
See application file for complete search history.

(56) References Cited

U.S. PATENT DOCUMENTS 8,504,842 B1 *  8/2013  Meacham ............ G06F 3/0488
                                              713/182
2009/0085877 A1   4/2009  Chang et al.
2010/0020035 A1   1/2010  Ryu et al.
(Continued)

FOREIGN PATENT DOCUMENTS

CN      102455666 A    5/2012
EP      2 472 375 A1   7/2012
(Continued)

OTHER PUBLICATIONS

Chinese Office Action dated Jul. 23, 2018, issued in Chinese Patent Application No. 201510684181.9.

*Primary Examiner* — Charles Hicks
(74) *Attorney, Agent, or Firm* — Jefferson IP Law, LLP

(57) ABSTRACT

An apparatus and a method for controlling security in an electronic device are provided. The operating method of an electronic device includes detecting at least one touch input, detecting at least one of a touch area, a touch shape, or the number of touches, which correspond to each of the at least one touch input, and creating a reference pattern for the unlocking, based on at least one of the touch area, the touch shape, or the number of touches, which correspond to each of the at least one touch input. Other embodiments may be provided.

14 Claims, 30 Drawing Sheets

(56) References Cited

U.S. PATENT DOCUMENTS

| | | | |
|---|---|---|---|
| 2010/0225443 A1* | 9/2010 | Bayram | G06F 21/316 340/5.83 |
| 2012/0169670 A1 | 7/2012 | Kim et al. | |
| 2012/0268240 A1 | 10/2012 | Frerking | |
| 2013/0053107 A1 | 2/2013 | Kang et al. | |
| 2014/0092039 A1 | 4/2014 | Ito | |
| 2014/0095994 A1 | 4/2014 | Kim | |
| 2014/0109217 A1 | 4/2014 | Park | |
| 2014/0259150 A1 | 9/2014 | Lee | |
| 2014/0267100 A1 | 9/2014 | Sohn et al. | |
| 2014/0300559 A1 | 10/2014 | Tanimoto et al. | |

FOREIGN PATENT DOCUMENTS

| | | |
|---|---|---|
| KR | 10-2012-0075714 A | 7/2012 |
| KR | 10-2014-0044968 A | 4/2014 |

\* cited by examiner

METHOD FOR CONTROLLING SECURITY AND ELECTRONIC DEVICE THEREOF

CROSS-REFERENCE TO RELATED APPLICATION(S)

This application claims the benefit under 35 U.S.C. § 119(a) of a Korean patent application filed on Oct. 20, 2014 in the Korean Intellectual Property Office and assigned Serial number 10-2014-0141871, the entire disclosure of which is hereby incorporated by reference.

TECHNICAL FIELD

The present disclosure relates to an apparatus and a method for controlling security in an electronic device.

BACKGROUND

With the development of information communication technology and semiconductor technology, various electronic devices have been developed into multimedia devices for providing various multimedia services. For example, portable electronic devices may provide various multimedia services, such as broadcast services, wireless Internet services, camera services, and music playing services.

The electronic device may provide a security function in order to prevent a third party from indiscriminately using personal information stored in the electronic device. For example, the electronic device may provide a locking service to protect the user's personal information.

The above information is presented as background information only to assist with an understanding of the present disclosure. No determination has been made, and no assertion is made, as to whether any of the above might be applicable as prior art with regard to the present disclosure.

SUMMARY

In the case of providing the locking service, the electronic device may provide a standardized unlocking method, such as inputting passwords or inputting patterns. Accordingly, the electronic device requires various unlocking methods in order to satisfy various desires of users.

Aspects of the present disclosure are to address at least the above-mentioned problems and/or disadvantages and to provide at least the advantages described below. Accordingly, an aspect of the present disclosure is to provide an apparatus and method for controlling security in an electronic device.

Another aspect of the present disclosure is to provide an apparatus and a method for providing a locking service, based on a touch area in the electronic device.

Another aspect of the present disclosure is to provide an apparatus and a method for providing a locking service, based on the shape by which the electronic device is touched.

Another aspect of the present disclosure is to provide an apparatus and a method for providing a locking service, based on the number the electronic device is touched.

In accordance with an aspect of the present disclosure, an electronic device is provided. The electronic device, includes a touch screen, and a processor configured to detect at least one of a touch area, a touch shape, or the number of touches, which correspond to each of at least one touch input detected through the touch screen, and create a reference pattern for the unlocking, based on at least one of the touch area, the touch shape, or the number of touches, which correspond to each of the at least one touch input.

In accordance with another aspect of the present disclosure, an electronic device is provided. The electronic device includes a touch screen, and a processor that detects a touch area corresponding to each of a plurality of touch inputs detected through the touch screen, detects an average of the touch areas corresponding to the plurality of touch inputs, and creates a reference area for separating the touch area to create an input pattern corresponding to the unlocking of the electronic device, based on the average of the touch areas.

In accordance with another aspect of the present disclosure, an operating method of an electronic device is provided. The operating method of an electronic device includes detecting at least one touch input, detecting at least one of a touch area, a touch shape, or the number of touches, which correspond to each of the eat least one touch input, and creating a reference pattern for the unlocking, based on at least one of the touch area, the touch shape, or the number of touches, which correspond to each of the eat least one touch input.

In accordance with another aspect of the present disclosure, an operating method of an electronic device is provided. The operating method of an electronic device includes detecting a plurality of touch inputs, detecting a touch area corresponding to each touch input of the plurality of touch inputs, detecting an average of the touch areas corresponding to the plurality of touch inputs, and creating a reference area for separating the touch area to create an input pattern corresponding to the unlocking of the electronic device, based on the average of the touch areas.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
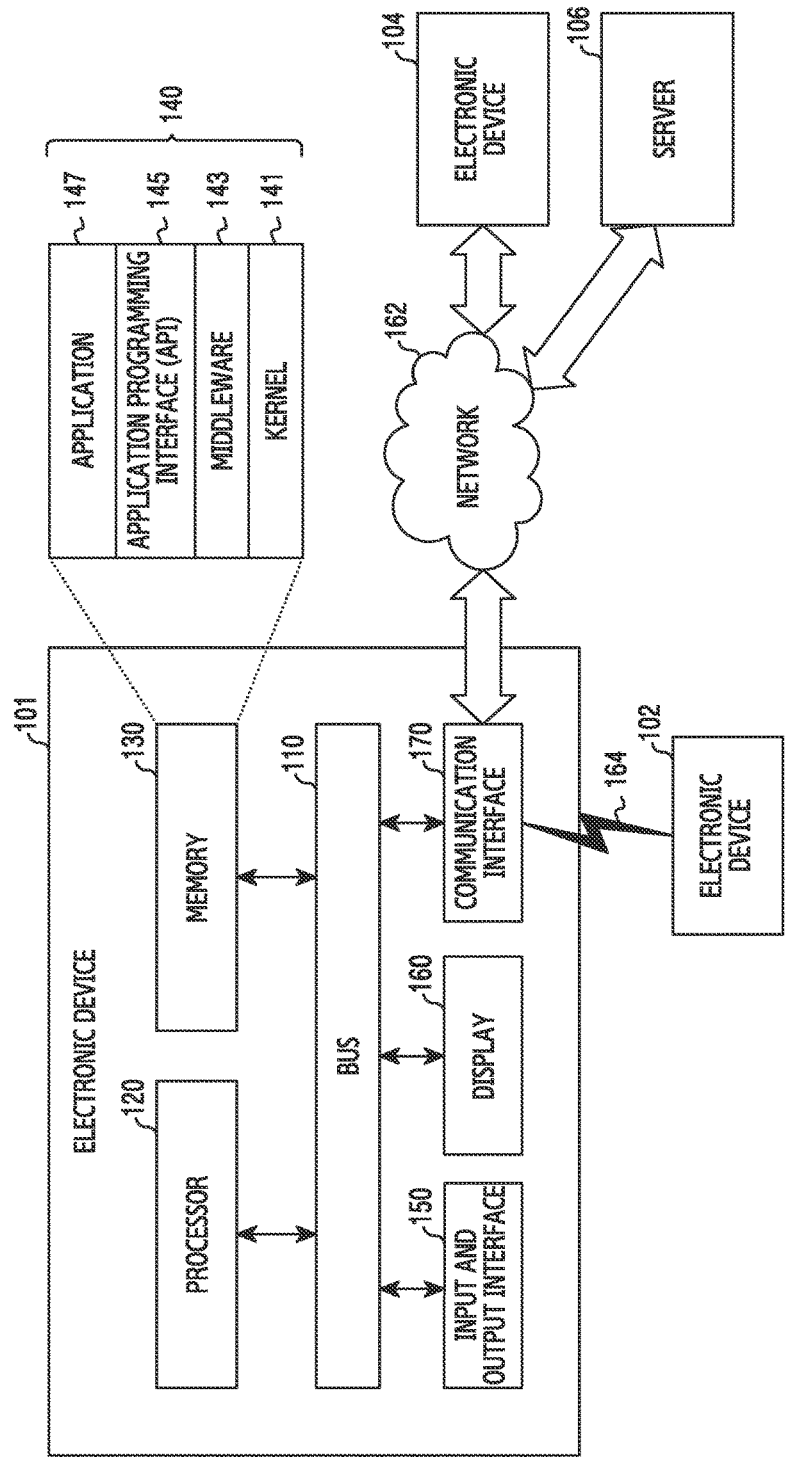
FIG. 1 is a block diagram of an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The terms "have", "may have", "include", or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, operations, elements, parts, or a combination thereof described in the specifications, and do not preclude the presence or addition of one or more other features, numbers, operations, elements, parts, or a combination thereof.

The terms "A or B", "at least one of A or/and B" or "one or more of A or/and B" used in the various embodiments of the present disclosure include any and all combinations of words enumerated with it. For example, "A or B", "at least one of A and B" or "at least one of A or B" describes (1) including at least one A, (2) including at least one B, or (3) including both at least one A and at least one B.

Although the term, such as "first" and "second" used in various embodiments of the present disclosure may modify various elements of various embodiments of the present disclosure, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of right of various embodiments of the present disclosure, and similarly, a second element may be named a first element.

It will be understood that when an element (e.g., a first element) is "connected to" or "(operatively or communicatively) coupled with/to" to another element (e.g., a second element), the element may be directly connected or coupled to another element, and there may be an intervening element (e.g., a third element) between the element and another element. To the contrary, it will be understood that when an element (e.g., the first element) is "directly connected" or "directly coupled" to another element (e.g., the second element), there is no intervening element (e.g., the third element) between the element and another element.

The expression "configured to (or set to)" used in various embodiments of the present disclosure may be replaced with "suitable for", "having the capacity to", "designed to", "adapted to", "made to", or "capable of" according to a situation. The term "configured to (set to)" does not necessarily indicate "specifically designed to" in a hardware level. Instead, the expression "apparatus configured to . . . " may indicate that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a central processing unit (CPU) or an application processor (AP), capable of performing a corresponding operation by executing one or more software programs stored in a memory device.

The terms as used herein are used merely to describe certain embodiments and are not intended to limit the present disclosure. Further, all the terms used herein, including technical and scientific terms, should be interpreted to have the same description as commonly understood by those skilled in the art to which the present disclosure pertains, and should not be interpreted to have ideal or excessively formal description unless explicitly defined in various embodiments of the present disclosure.

The module or program module according to various embodiments of the present disclosure may further include at least one or more constitutional elements among the aforementioned constitutional elements, or may omit some of them, or may further include additional other constitutional elements. Operations performed by a module, programming module, or other constitutional elements according to various embodiments of the present disclosure may be executed in a sequential, parallel, repetitive, or heuristic manner. In addition, some of the operations may be executed in a different order or may be omitted, or other operations may be added.

An electronic device according to various embodiments of the present disclosure may be a device. For example, the electronic device according to various embodiments of the present disclosure may include at least one of a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), an moving picture experts group (MPEG-1 or MPEG-2) audio layer 3 (MP3) player, a mobile medical device, a camera, or a wearable device (e.g., a head-mounted-device (HMD), an electronic glasses, an electronic clothing, an electronic bracelet, an electronic necklace, an electronic appcessory, an electronic tattoo, a smart mirror, a smart watch, and the like).

In various embodiments of the present disclosure, an electronic device may be a smart home appliance. For example, of such appliances may include at least one of a television (TV), a digital versatile disc (DVD) player, an audio component, a refrigerator, an air conditioner, a vacuum cleaner, an oven, a microwave oven, a washing machine, an air cleaner, a set-top box, a home automation control panel, a security control panel, a TV box (e.g., Samsung HomeSync®, Apple TV®, or Google TV), a game console (e.g., Xbox® PlayStation®), an electronic dictionary, an electronic key, a camcorder, an electronic frame, and the like.

In various embodiments of the present disclosure, an electronic device may include at least one of a medical equipment (e.g., a mobile medical device (e.g., a blood glucose monitoring device, a heart rate monitor, a blood pressure monitoring device, a temperature meter, and the like), a magnetic resonance angiography (MRA) machine, a magnetic resonance imaging (MRI) machine, a computed tomography (CT) scanner, an ultrasound machine, and the like), a navigation device, a global positioning system (GPS) receiver, an event data recorder (EDR), a flight data recorder (FDR), an in-vehicle infotainment device, an electronic equipment for a ship (e.g., a ship navigation equipment and/or a gyrocompass), an avionics equipment, a security equipment, a head unit for vehicle, an industrial or home robot, an automatic teller machine (ATM) of a financial institution, point of sale (POS) device at a retail store, or an internet of things device (e.g., a lightbulb, various sensors, an electronic meter, a gas meter, a sprinkler, a fire alarm, a thermostat, a streetlamp, a toaster, a sporting equipment, a hot-water tank, a heater, a boiler, and the like)

In certain embodiments of the present disclosure, an electronic device may include at least one of a piece of furniture or a building/structure, an electronic board, an electronic signature receiving device, a projector, and various measuring instruments (e.g., a water meter, an electricity meter, a gas meter, a wave meter, and the like).

An electronic device according to various embodiments of the present disclosure may also include a combination of one or more of the above-mentioned devices.

Further, it will be apparent to those skilled in the art that an electronic device according to various embodiments of the present disclosure is not limited to the above-mentioned devices.

The term "user" may indicate a person who uses an electronic device or a device (e.g., an artificial intelligence electronic device) that uses the electronic device.

FIG. 1 is a block diagram of an electronic device according to an embodiment of the present disclosure.

Referring to FIG. 1, an electronic device 101 may include a bus 110, a processor 120, a memory 130, an input/output interface 150, a display 160, and a communication interface 170. According to various embodiments of the present disclosure, at least one of the components of the electronic device 101 may be omitted, or other components may be additionally included in the electronic device 101.

The bus 110 may be a circuit that connects the processor 120, the memory 130, the input/output interface 150, the display 160, or the communication interface 170 and transmits communication (e.g., control messages) between the above described components.

The processor 120 may include one or more of a CPU, an AP, and a communication processor (CP). For example, the processor 120 may carry out operations or data processing related to control and/or communication of at least one other component of the electronic device 101.

A processor 120 may unlock the electronic device 101, based on touch information detected through a touch screen (e.g., the display 160).

According to an embodiment, the processor 120 may determine a reference touch area for separating touch areas (e.g., a large touch area, or a small touch area), based on the touch areas of a plurality of touch inputs detected through the touch screen. For example, the processor 120 may determine a reference touch area for the recognition of a larger touch area, based on the average touch area of a plurality of touch inputs detected through the touch screen. For example, the processor 120 may determine a reference touch area for the recognition of a small touch area, based on an average touch area of a plurality of touch inputs detected through the touch screen. For example, the processor 120 may determine a reference touch area for separating the touch area, based on an average touch area of a plurality of touch inputs for configuring a large reference touch area, and the average touch area of a plurality of touch inputs for configuring a small reference touch area.

According to an embodiment of the present disclosure, the processor 120 may create a reference pattern (a password) to unlock the electronic device 101, based on the touch area (e.g., a large touch area, or a small touch area) corresponding to each of the touch inputs detected through the touch screen. For example, the processor 120 may create the n-th variable of a reference pattern, based on the touch area that corresponds to the n-th touch input. For example, when the touch corresponding to the n-th touch input is released, the processor 120 may create the n-th variable of the reference pattern, based on the touch area of the n-th touch input. For example, the reference pattern may represent a code for comparing the user's input information with the same upon the unlocking of the electronic device 101.

According to an embodiment of the present disclosure, when creating the reference pattern, the processor 120 may create at least one of a haptic effect (e.g., vibration) or a graphic effect, which correspond to the touch area of the touch input, in order for the user to recognize the touch area of the touch input.

According to an embodiment of the present disclosure, the processor 120 may create a reference pattern for the unlocking of the electronic device 101, based on a touch area and a touch movement, which correspond to each touch input detected through the touch screen. For example, the processor 120 may create the n-th variable of the reference pattern, based on the touch area, or the touch area and the touch movement, which correspond to the n-th touch input. For example, when the touch corresponding to the n-th touch input is released, the processor 120 may create the n-th variable of the reference pattern, based on the touch area, or the touch area and the touch movement of the n-th touch input.

According to an embodiment of the present disclosure, the processor 120 may create a reference pattern for the unlocking of the electronic device 101, based on a touch shape corresponding to each touch input detected through the touch screen. For example, the processor 120 may create the n-th variable of the reference pattern, based on the touch shape corresponding to the n-th touch input. For example, when the touch corresponding to the n-th touch input is released, the processor 120 may create the n-th variable of the reference pattern, based on the touch shape of the n-th touch input.

According to an embodiment of the present disclosure, when creating the reference pattern, the processor 120 may create at least one of a haptic effect (e.g., vibration) or a graphic effect, which correspond to the touch shape of the touch input, in order for the user to recognize the size of the touch shape of the touch input.

According to an embodiment of the present disclosure, the processor 120 may create a reference pattern for the unlocking of the electronic device 101, based on a touch shape and a touch movement, which correspond to each touch input detected through the touch screen. For example, the processor 120 may create the n-th variable of the reference pattern, based on the touch shape, or the touch shape and the touch movement, which correspond to the n-th touch input. For example, when the touch corresponding to the n-th touch input is released, the processor 120 may create the n-th variable of the reference pattern, based on the touch shape, or the touch shape and the touch movement of the n-th touch input.

According to an embodiment of the present disclosure, the processor 120 may create a reference pattern for the unlocking of the electronic device 101, based on the number of touches detected through the touch screen. For example, the processor 120 may create the n-th variable of the reference pattern, based on the number of touches corresponding to the n-th touch input.

According to an embodiment of the present disclosure, the processor 120 may create an input pattern for the unlocking of the electronic device 101, based on touch information (e.g., the touch area, the touch shape, the number of touches, the touch movement, and the like) detected through the touch screen. If the input pattern for the unlocking matches a pre-created reference pattern, the processor 120 may unlock the electronic device 101.

According to an embodiment, of the present disclosure when creating the input pattern, the processor 120 may make a control to display variable information of the input pattern created based on the touch information on the display 160 in order for the user to recognize the input pattern information.

A memory 130 may include a volatile memory and/or a non-volatile memory.

The memory 130 may store commands or data (e.g., the reference pattern, or the reference touch area) related to at least one of other elements of the electronic device 101. According to an embodiment of the present disclosure, the memory 130 may store software and/or a program 140. The program 140 may include, for example, a kernel 141, middleware 143, an application programming interface (API) 145, and/or application programs (or "applications") 147. At least some of the kernel 141, the middleware 143, and the API 145 may be referred to as an operating system (OS).

The kernel 141 may control or manage system resources (e.g., the bus 110, the processor 120, or the memory 130) used for performing an operation or function implemented by the other programs (e.g., the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143, for example, may function as an intermediary for allowing the API 145 or the application programs 147 to communicate with the kernel 141 to exchange data.

In addition, the middleware 143 may process one or more task requests received from the application programs 147 according to priorities thereof. For example, the middleware 143 may assign priorities for using the system resources (e.g., the bus 110, the processor 120, the memory 130, and the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., an instruction) for file control, window control, image processing, text control, and the like.

The input/output interface 150, for example, may function as an interface that may transfer instructions or data input from a user or another external device to the other element(s) of the electronic device 101. Furthermore, the input/output interface 150 may output the instructions or data received from the other element(s) of the electronic device 101 to the user or another external device.

The display 160 may include, for example, a liquid crystal display (LCD), a light emitting diode (LED) display, an organic LED (OLED) display, a micro electro mechanical system (MEMS) display, an electronic paper display, and the like. The display 160, for example, may display various types of content (e.g., a text, images, videos, icons, symbols, and the like) for the user. The display 160 may include a touch screen and receive, for example, a touch, a gesture, proximity, a hovering input, and the like, using an electronic pen or the user's body part. According to an embodiment of the present disclosure, the display 160 may display a web page.

The communication interface 170, for example, may set communication between the electronic device 101 and an external device (e.g., a first external electronic device 102, a second external electronic device 104, or a server 106). For example, the communication interface 170 may be connected to a network 162 through wireless or wired communication to communicate with the external device (e.g., the second external electronic device 104 or the server 106).

The wireless communication may use at least one of, for example, long term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM), as a cellular communication protocol. In addition, the wireless communication may include, for example, a short range communication 164. The short-range communication 164 may include at least one of, for example, wireless fidelity (Wi-Fi), bluetooth (BT), near field communication (NFC), and GPS.

The wired communication may include at least one of, for example, a universal serial bus (USB), a high definition multimedia interface (HDMI), recommended standard-232 (RS-232), and a plain old telephone service (POTS).

The network 162 may include at least one of a communication network, such as a computer network (e.g., a local area network (LAN) or a wide area network (WAN)), the Internet, a telephone network, and the like.

Each of the first external electronic device 102 and the second external electronic device 104 may be a device which is the same as or different from the electronic device 101. According to an embodiment of the present disclosure, the server 106 may include a group of one or more servers. According to various embodiments of the present disclosure, all or a part of operations performed in the electronic device 101 may be performed in the other electronic device or multiple electronic devices (e.g., the first external electronic device 102 or the second external electronic device 104 or the server 106). According to an embodiment of the present disclosure, when the electronic device 101 should perform some functions or services automatically or by a request, the electronic device 101 may make a request for performing at least some functions related to the functions or services to another device (e.g., the first external electronic device 102 or the second external electronic device 104, or the server 106) instead of performing the functions or services by itself or additionally. Another electronic device (e.g., the first external electronic device 102 or the second external electronic device 104, or the server 106) may perform a function requested from the electronic device 101 or an additional function and transfer the performed result to the electronic device 101. The electronic device 101 may provide the requested function or service to another electronic device by processing the received result as it is or additionally. To this end, for example, cloud computing, distributed computing, or client-server computing technology may be used.

According to various embodiments of the present disclosure, the electronic device 101 may determine the reference touch area and create the reference pattern by using at least one module that is functionally or physically separated from the processor 120.

Figure 2:
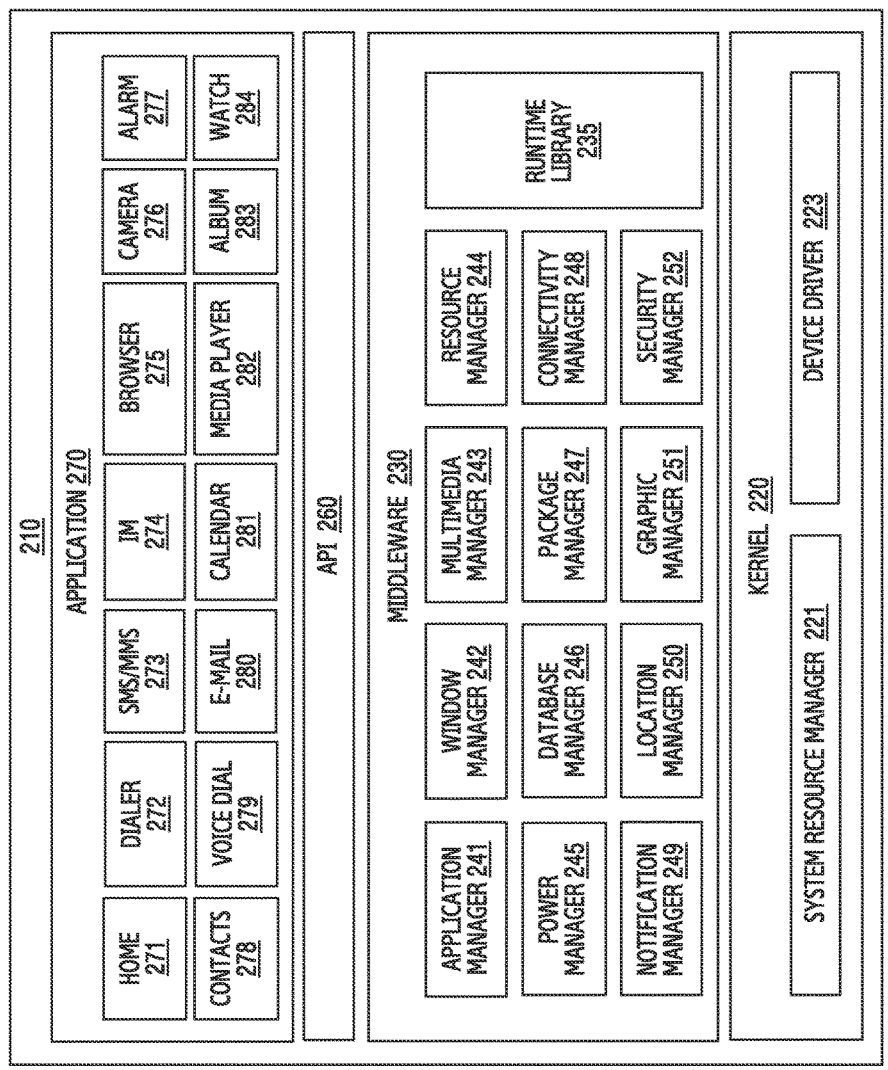
FIG. 2 is a block diagram of a program module according to various embodiments of the present disclosure.

FIG. 2 illustrates a block diagram of a program module according to an embodiment of the present disclosure.

Referring to FIG. 2, according to an embodiment of the present disclosure, a program module 210 (e.g., the program 140) may include an OS for controlling resources associated with an electronic apparatus (e.g., the electronic device 101) and/or various applications (e.g., the application program 147) running on the OS. The OS may be, for example, Android, iOS, Windows, Symbian, Tizen, Bada, and the like.

The programming module 210 may include a kernel 220, middleware 230, an API 260, and/or an application 270. At least a part of the program module 210 may be preloaded on the electronic device (e.g., the electronic device 101) or downloaded from the server.

The kernel 220 (e.g., the kernel 141) may include, for example, a system resource manager 221 or a device driver 223. The system resource manager 221 may control, allocate, or collect the system resources. According to an embodiment of the present disclosure, the system resource manager 221 may include a process management unit, a memory management unit, a file system management unit, and the like. The device driver 223 may include, for example, a display driver, a camera driver, a BT driver, a shared-memory driver, a USB driver, a keypad driver, a Wi-Fi driver, an audio driver, an inter-process communication (IPC) driver, and the like. According to an embodiment of the present disclosure, a Wi-Fi driver of the kernel 220 may control at least one of an antenna mode or a transmission period of a network control message for use to transmit and receive signals to and from the communication interface 170.

The middleware 230 may provide, for example, a function commonly required by the applications 270 in common or provide various functions to the applications 270 through the API 260 so that the applications 270 may efficiently use limited system resources within the electronic device. According to an embodiment of the present disclosure, the middleware 230 (e.g., the middleware 143) may include, for example, at least one of a runtime library 235, an application manager 241, a window manager 242, a multimedia manager 243, a resource manager 244, a power manager 245, a database manager 246, a package manager 247, a connectivity manager 248, a notification manager 249, a location manager 250, a graphic manager 251, and a security manager 252.

The runtime library 235 may include, for example, a library module that a compiler uses to add new functions through a programming language while the application 270 is executed. The run time library 235 may perform input/output management, memory management, or a function for an arithmetic function.

The application manager 241 may manage, for example, a life cycle of at least one of the applications 270. The window manager 242 may manage graphical user interface (GUI) resources used by a screen. The multimedia manager 243 may grasp formats required for the reproduction of various media files, and may perform an encoding or decoding of the media file by using a codec suitable for the corresponding format. The resource manager 244 may manage resources, such as a source code, a memory, and a storage space of at least one of the applications 270.

The power manager 245 may operate together with a basic input/output system (BIOS) to manage a battery or power and may provide power information required for the operation of the electronic device. The database manager 246 may generate, search for, or change a database to be used by at least one of the applications 270. The package manager 247 may manage the installation or the updating of applications distributed in the form of package file.

The connectivity manager 248 may manage wireless connection of, for example, Wi-Fi or BT. The notification manager 249 may display or notify of an event, such as an arrival message, a promise, a proximity notification, and the like, in such a way that does not disturb a user. The location manager 250 may manage location information of the electronic device. The graphic manager 251 may manage graphic effects to be provided to a user and user interfaces related to the graphic effects. The security manager 252 may provide all security functions required for system security or user authentication.

According to an embodiment of the present disclosure, the middleware 230 may control at least one of the transmission period of an antenna mode or a transmission period of a network control message for use to transmit and receive signals to and from the communication interface 170 by using at least one manager.

According to an embodiment of the present disclosure, when the electronic device (e.g., the electronic device 101) has a call function, the middleware 230 may further include a telephony manager for managing a voice call function or a video call function of the electronic device.

The middleware 230 may include a middleware module for forming a combination of various functions of the aforementioned components. The middleware 230 may provide modules specialized according to types of OSs in order to provide differentiated functions. Further, the middleware 230 may dynamically remove some of the existing components or add new components.

The API 260 (e.g., the API 145) is, for example, a set of API programming functions, and a different configuration thereof may be provided according to an OS. For example, with respect to each platform, one API set may be provided in a case of Android or iOS, and two or more API sets may be provided in a case of Tizen.

The applications 270 (e.g., the application programs 147) may include, for example, one or more applications which may provide functions, such as a home function 271, a dialer 272, a short messaging service (SMS)/multimedia messaging service (MMS) 273, an instant message (IM) 274, a browser 275, a camera 276, an alarm 277, contacts 278, a voice dialer 279, an email 280, a calendar 281, a media player 282, an album 283, a clock 284, a healthcare function (e.g., to measure exercise burnt calorie, or blood sugar), or an environment information (e.g., an atmospheric pressure, humidity, temperature information, and the like).

According to an embodiment of the present disclosure, the application 270 may include an application (hereinafter, for convenience of explanation, "Information Exchange application") that supports the exchange of information between the electronic device (e.g., the electronic device 101) and the external electronic device. The application associated with exchanging information may include, for example, a notification relay application for notifying an external electronic device of certain information or a device management application for managing an external electronic device.

For example, a notification relay application may include a function of transferring the notification information generated by other applications (e.g., an SMS/MMS application, an e-mail application, a healthcare application, an environmental information application, and the like) of the electronic device to the external electronic device. Further, the notification relay application may receive notification information from, for example, the external electronic device and provide the received notification information to the user. For example, the device management application may manage (e.g., install, delete, or update) at least one function (e.g., turning on/off the external electronic device itself (or some elements thereof) or adjusting the brightness (or resolution) of a display) of the external electronic device communicating with the electronic device, applications operating in the external electronic device, or services (e.g., a telephone call service or a message service) provided from the external electronic device.

According to an embodiment of the present disclosure, the application 270 may include an application (e.g., a health management application) specified according to an attribute (e.g., as an attribute of the electronic device, the type of electronic device is a mobile medical equipment) of the external electronic device. According to an embodiment of the present disclosure, the application 270 may include an application received from the external electronic device (e.g., a server, an electronic device, and the like). According to an embodiment of the present disclosure, the applications 270 may include a preloaded application or a third party application which may be downloaded from the server. The names of the elements of the program module 210, according to the embodiment illustrated in FIG. 2, may vary according to the type of OS.

According to various embodiments of the present disclosure, at least a part of the programming module 210 may be implemented in software, firmware, hardware, or a combination of two or more thereof. At least a part of the program module 210 may be implemented (e.g., executed), for example, by a processor (e.g., by an application program). At least some of the programming module 210 may include, for example, a module, program, routine, sets of instructions, or process for performing one or more functions.

According to various embodiments of the present disclosure, an electronic device (e.g., the electronic device 101 of FIG. 1) may include: a touch screen; and a processor that detects at least one of a touch area, a touch shape, or the number of touches, which correspond to each of one or more touch inputs detected through the touch screen, and creates a reference pattern for the unlocking, based on at least one of the touch area, the touch shape, or the number of touches, which correspond to each touch input.

In various embodiments of the present disclosure, the processor, when the touch input is detected through the touch screen, may create a variable of the reference pattern corresponding to the touch input, based on at least one of the touch area, the touch shape, or the number of touches, which correspond to the touch input.

In various embodiments of the present disclosure, in creating the reference pattern, based on at least one of the touch area or the touch shape, when a multi-touch input is detected through the touch screen, the processor may detect at least one of the touch area or the touch shape, which correspond to each touch region detected by the multi-touch input, and may create variables of the reference pattern corresponding to the multi-touch input, based on at least one of the touch area or the touch shape, which correspond to the touch regions of the multi-touch input.

In various embodiments of the present disclosure, the processor may detect a touch movement corresponding to the first touch input among one or more touch inputs, and may create variables of the reference pattern corresponding to the first touch input by additionally using the detected touch movement, based on at least one of the touch area, the touch shape, or the number of touches, which correspond to the first touch input.

In various embodiments of the present disclosure, the processor may create at least one of a haptic effect or a graphic effect to correspond to at least one of the touch area, the touch shape, or the number of touches of the touch input.

In various embodiments, the processor may create a user input pattern, based on at least one of the touch area, the touch shape, or the number of touches, which correspond to each of one or more touch inputs detected through the touch screen, and may unlock the electronic device, based on the comparison result of the user input pattern and the reference pattern.

In various embodiments of the present disclosure, if the user input pattern matches the reference pattern, the processor may unlock the electronic device, and if the user input pattern does not match the reference pattern, the processor may maintain the electronic device in the locked state.

According to various embodiments of the present disclosure, an electronic device (e.g., the electronic device 101 of FIG. 1) may include: a touch screen; and a processor that detects a touch area corresponding to each of a plurality of touch inputs detected through the touch screen, detects an average of the touch areas corresponding to the plurality of touch inputs, and creates a reference area for separating the touch area to create an input pattern corresponding to the unlocking of the electronic device, based on the average of the touch areas.

In various embodiments of the present disclosure, the processor may separate the type of touch area corresponding to each touch input, based on the comparison result of the touch area corresponding to each of one or more touch inputs detected through the touch screen and the reference area, and may create a reference pattern for the unlocking, based on the type of touch area corresponding to each touch input.

In various embodiments of the present disclosure, the processor: may separate the type of touch area corresponding to each touch input, based on the comparison result of the touch area corresponding to each of one or more touch inputs detected through the touch screen and the reference area; may create a user input pattern, based on the type of touch area corresponding to each touch input; and may unlock the electronic device, based on the comparison result of the user input pattern and the reference pattern.

FIGS. 3A to 3D illustrate a configuration of a screen for configuring a reference touch area, according to the embodiment of the present disclosure.

Figure 3A:
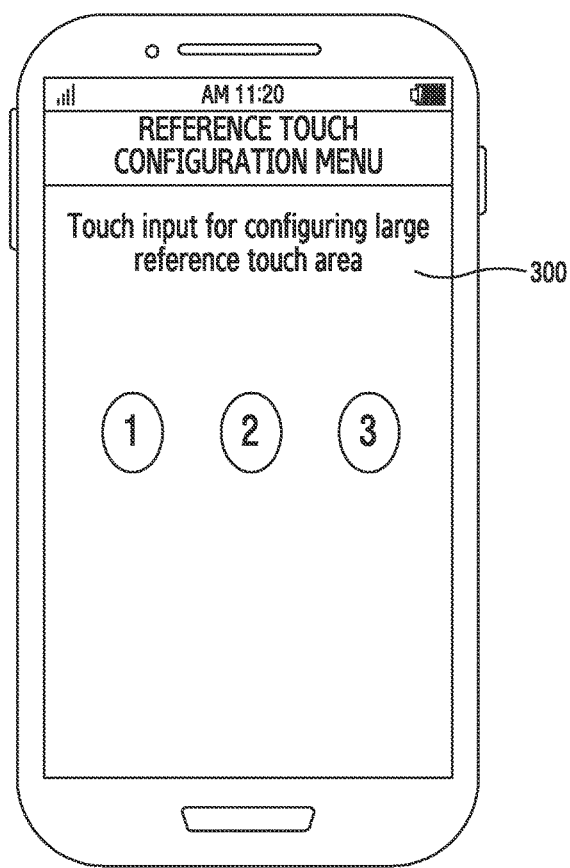
FIGS. 3A, 3B, 3C, and 3D illustrate a configuration of a screen for configuring a reference touch area according to various embodiments of the present disclosure.

Referring to FIG. 3A, the electronic device (e.g., the electronic device 101) may display a reference touch configuration image 300, which allows the user to make a plurality of touch inputs for configuring a large reference touch area, on the display (e.g., the display 160).

Figure 3B:
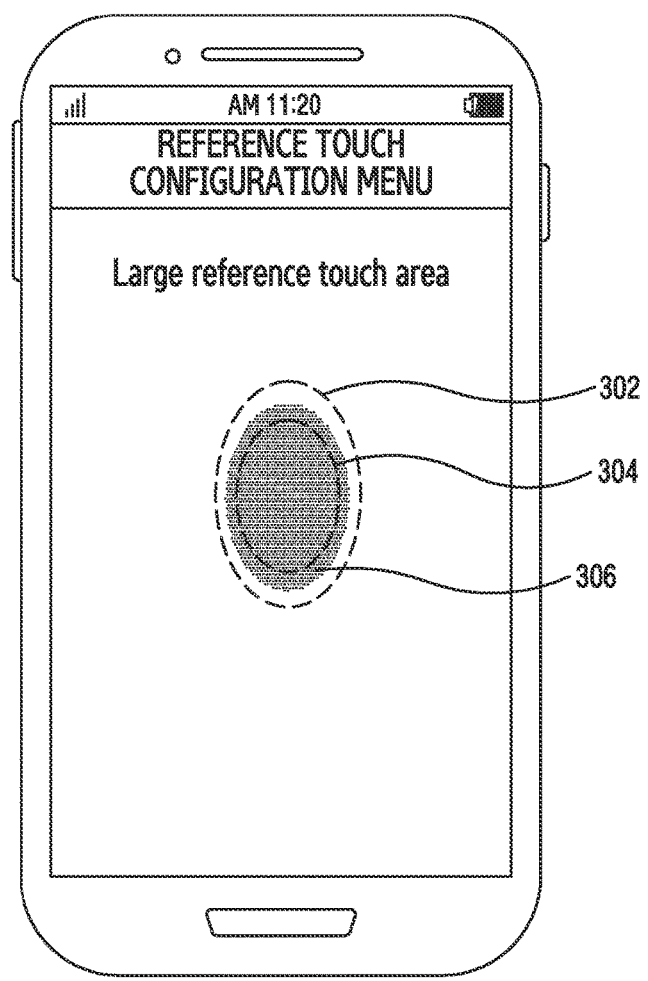

Referring to FIG. 3B, a plurality of touch inputs (e.g., N touch inputs) are detected through the reference touch configuration image 300, the electronic device may configure an average touch area 306 of a plurality of touch inputs 302 and 304 as the large reference touch area.

Figure 3C:
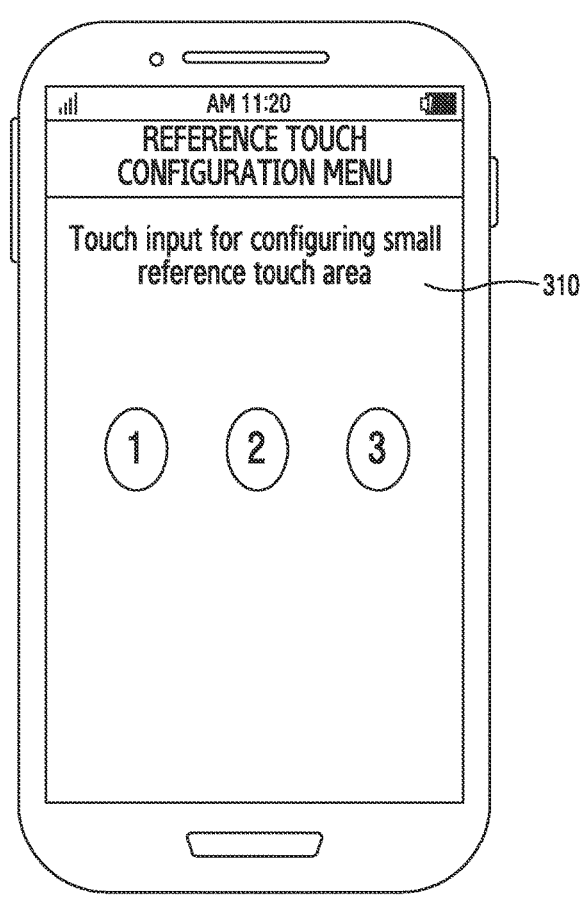

Referring to FIG. 3C, the electronic device may display a reference touch configuration image 310, which allows the user to make a plurality of touch inputs for configuring a small reference touch area, on the display (e.g., the display 160).

Figure 3D:
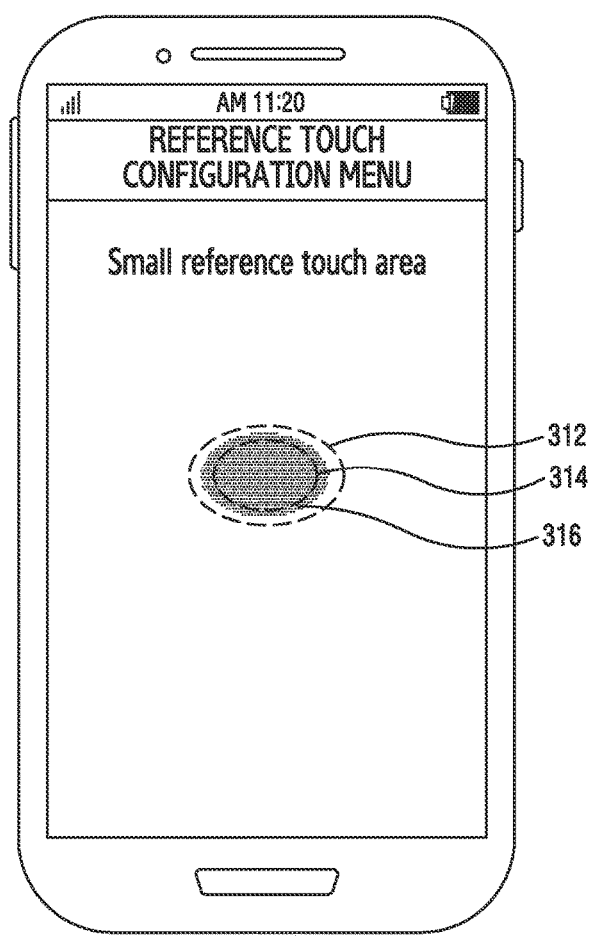

Referring to FIG. 3D, a plurality of touch inputs (e.g., N touch inputs) are detected through the reference touch configuration image 310, the electronic device may configure an average touch area 316 of a plurality of touch inputs 312 and 314 as the small reference touch area.

According to an embodiment of the present disclosure, the electronic device may configure the large reference touch area 306 of FIG. 3B or the small reference touch area 316 of FIG. 3D as the reference touch area to separate the touch areas (e.g., a large touch area, or a small touch area).

According to an embodiment of the present disclosure, the electronic device may configure the reference touch area to separate the touch areas (e.g., a large touch area, or a small touch area), based on the difference between the large reference touch area 306 of FIG. 3B and the small reference touch area 316 of FIG. 3D.

Figure 4:
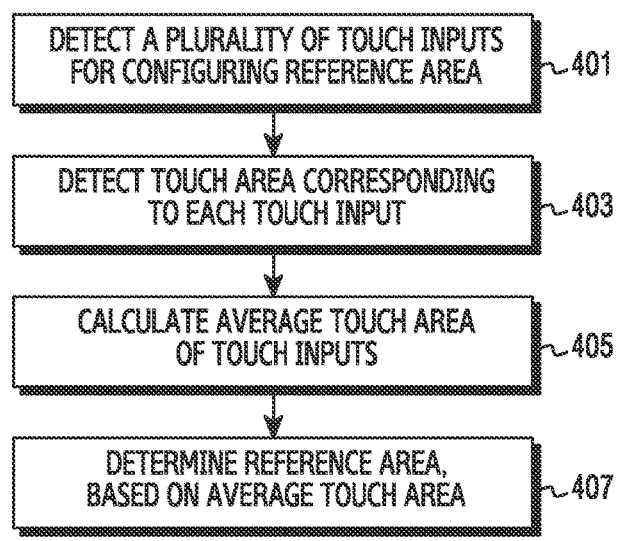
FIG. 4 is a flowchart for configuring a reference touch area in an electronic device according to various embodiments of the present disclosure.

FIG. 4 is a flowchart for configuring a reference touch area in an electronic device, according to the embodiment of the present disclosure.

Referring to FIG. 4, in operation 401, an electronic device (e.g., the electronic device 101) may detect a plurality of touch inputs for configuring the reference area (e.g., a large reference touch area, or a small reference touch area) through the reference touch configuration image 300 or 310.

In operation 403, the electronic device may detect the touch area corresponding to each of the plurality of touch inputs. For example, when the electronic device uses a capacitive touch type, the electronic device may detect the touch area of the corresponding touch input, based on one or more touch coordinates in which a change in the capacitance is detected due to the touch input. For example, in the case of a pressure-sensitive touch type, the electronic device may extract one or more touch coordinates of the touch detection, based on a change in the resistance due to the touch input. The electronic device may detect the touch area of the corresponding touch input, based on one or more of the extracted touch coordinates.

In operation 405, the electronic device may calculate an average touch area of the plurality of touch inputs.

In operation 407, the electronic device may determine the average touch area as the reference touch area for separating the touch areas (e.g., a large touch area, or a small touch area).

Figure 5:
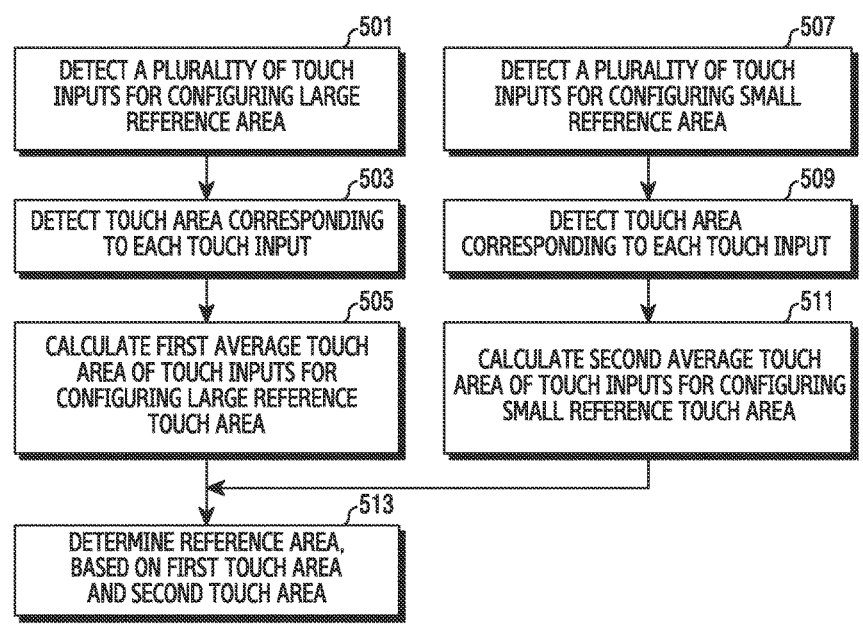
FIG. 5 is a flowchart for configuring a reference touch area in an electronic device according to various embodiments of the present disclosure.

FIG. 5 is a flowchart for configuring a reference touch area in an electronic device, according to the embodiment of the present disclosure.

Referring to FIG. 5, in operation 501, an electronic device (e.g., the electronic device 101) may detect a plurality of touch inputs for configuring a large reference touch area through the large reference touch configuration image 300.

In operation 503, the electronic device may detect a touch area corresponding to each of the plurality of touch inputs.

In operation 505, the electronic device may calculate the first average touch area of the plurality of touch inputs.

In operation 507, the electronic device may detect a plurality of touch inputs for configuring a small reference touch area through the small reference touch configuration image 310.

In operation 509, the electronic device may detect a touch area corresponding to each of the plurality of touch inputs.

In operation 511, the electronic device may calculate the second average touch area of the plurality of touch inputs.

In operation 513, the electronic device may determine a reference touch area for the separating of the touch area (e.g., a large touch area, or a small touch area), using the first average touch area and the second average touch area. For example, the electronic device may determine the reference touch area for the separating of the touch area, based on a difference between the first average touch area and the second average touch area.

In the case of FIG. 5, the electronic device may calculate the first average touch area of the plurality of touch inputs for the configuration of the large reference touch area (the operations 501 to 505), and may calculate the second average touch area of the plurality of touch inputs for the configuration of the small reference touch area (the operations 507 to 511). According to an embodiment, the operation of calculating the first average touch area (operations 501 to 505) and the operation of calculating the second average touch area (operations 507 to 511) may be changed in its sequence.

FIGS. 6A to 6D illustrate a configuration of a screen for creating a reference pattern, based on the touch area, according to the embodiment of the present disclosure.

Figure 6A:
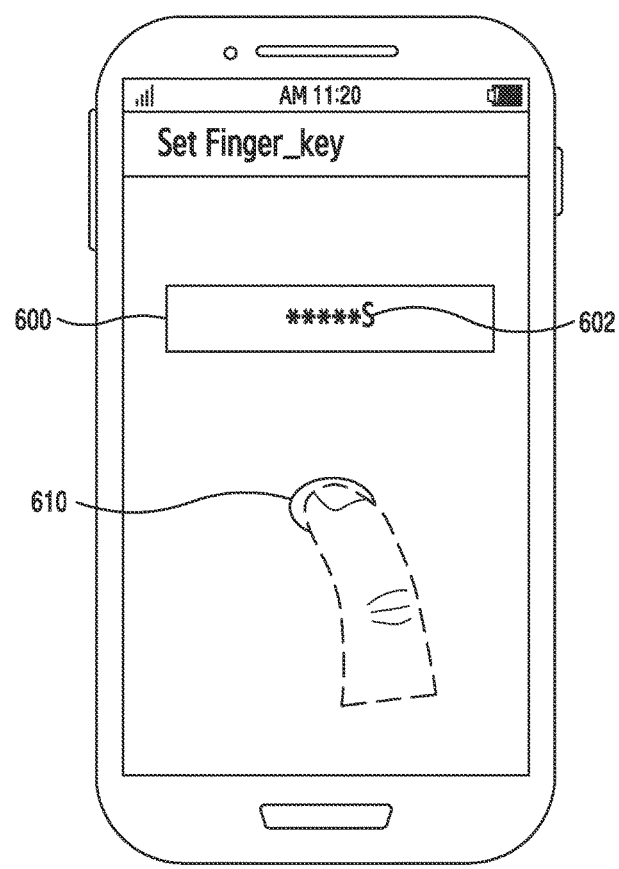
FIGS. 6A, 6B, 6C, and 6D illustrate a configuration of a screen for creating a reference pattern, based on a touch area according to various embodiments of the present disclosure.

Referring to FIG. 6A, an electronic device (e.g., the electronic device 101) may display a reference pattern creation image on the display (e.g., the display 160). For example, the electronic device may include a pattern input area 600 that displays variables of the reference pattern for the unlocking in at least a partial area of the reference pattern creation image.

According to an embodiment of the present disclosure, if a touch input is detected through the reference pattern creation image, the electronic device may compare the touch area of a touch input 610 with a preset reference touch area to thereby separate the touch area of the touch input. For example, as shown in FIG. 6A, if the touch area of the sixth touch input 610 is less than the reference touch area, the electronic device may display touch area information (e.g., a sign indicating the small touch area) corresponding to the touch input 610 as a sixth variable (e.g., "S") 602 of the reference pattern, in the pattern input area 600. For example, if the sixth touch input 610 is detected, the electronic device may display touch area information of other touch inputs except for the touch area information 602 of the sixth touch input 610, using a uniform sign (e.g., "*"), in order to prevent other users from identifying the same. For example, if another touch input is not detected within a reference time from the detection time of the sixth touch input 610, the electronic device may change the touch area information 602 displayed in the pattern input area 600 into the uniform sign.

Figure 6B:
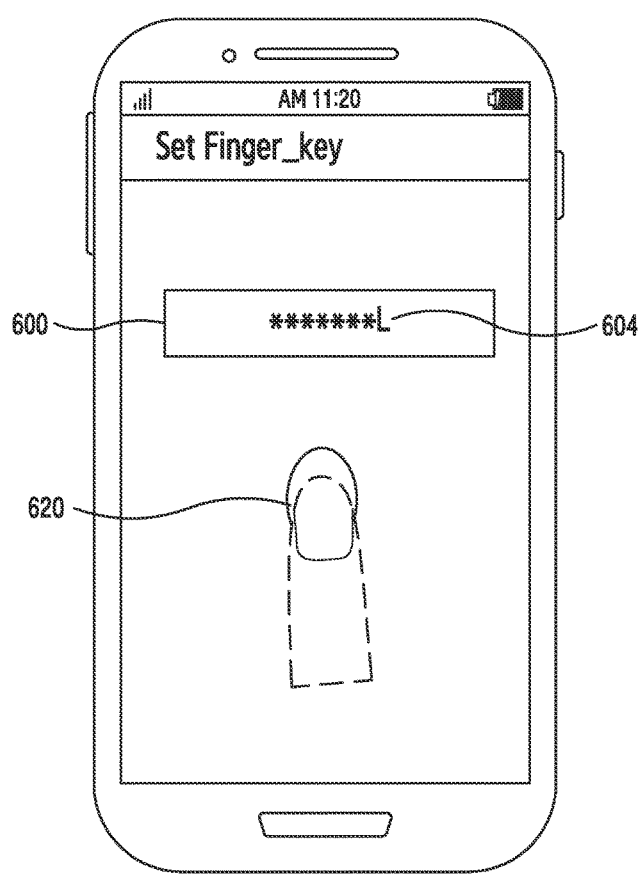
Figure 6C:
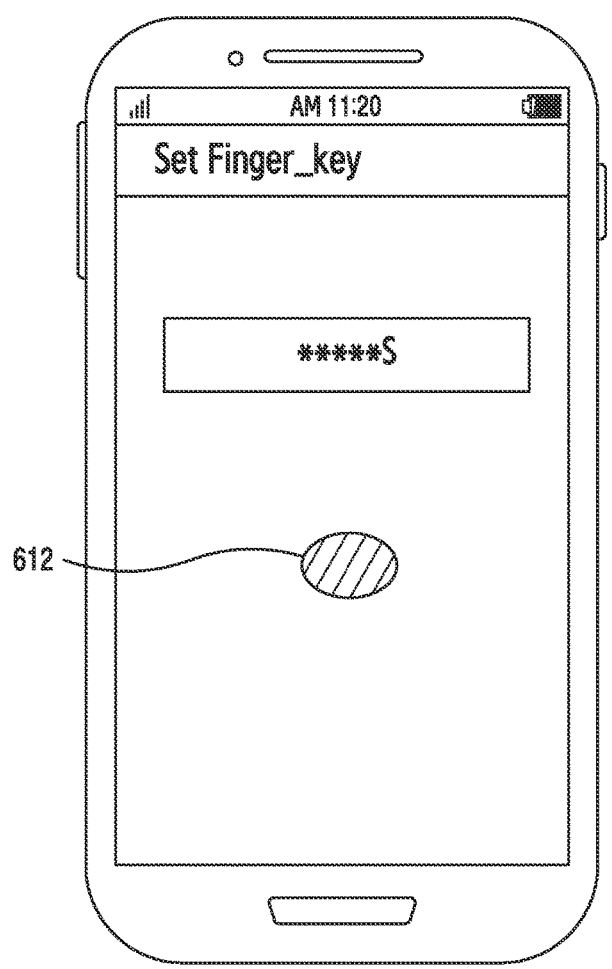

Referring to FIG. 6C, the electronic device may display a graphic effect 612 corresponding to the touch area (e.g., the small touch area) of the touch input 610, in order for the user to recognize the touch area of the touch input 610.

Referring to FIG. 6B, if the touch area of an eighth touch input 620 is equal to or more than the reference touch area, the electronic device may display touch area information (e.g., a sign indicating a large touch area) corresponding to the touch input 620 as an eighth variable (e.g., "L") 604 of the reference pattern, in the pattern input area 600. For example, if the eighth touch input 620 is detected, the electronic device may display the touch area information of other touch inputs except for the touch area information 604 of the eighth touch input 620, using a uniform sign (e.g., "*"), in order to prevent other users from identifying the same. For example, if another touch input is not detected within a reference time from the detection time of the eighth touch input 620, the electronic device may change the touch area information 604 displayed in the pattern input area 600 into the uniform sign.

Figure 6D:
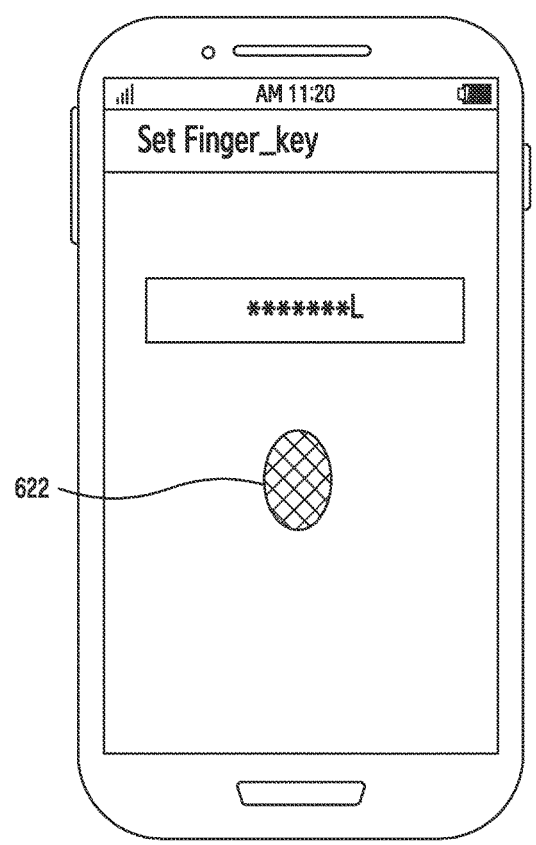

Referring to FIG. 6D, the electronic device may display a graphic effect 622 corresponding to the touch area (e.g., the large touch area) of the touch input 620, in order for the user to recognize the touch area of the touch input 620.

According to an embodiment of the present disclosure, if a reference pattern creation completion event is detected, the electronic device may configure the pattern information displayed in the pattern input area 600 as the reference pattern. For example, if another touch input is not detected within a reference time from the detection time of the touch input, the electronic device may recognize that the configuration of the reference pattern has been completed. For example, if the electronic device detects the selection of an icon or a menu corresponding to the completion of the reference pattern creation, the electronic device may recognize that the configuring of the reference pattern has been completed.

Figure 7A:
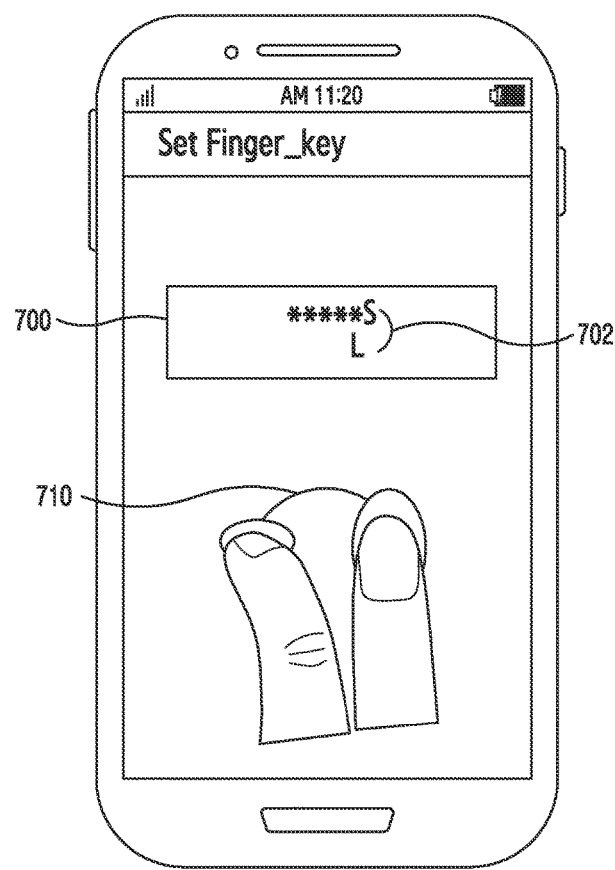
FIGS. 7A and 7B illustrate a configuration of a screen for creating a reference pattern, based on a touch area by a multi-touch according to various embodiments of the present disclosure.
Figure 7B:
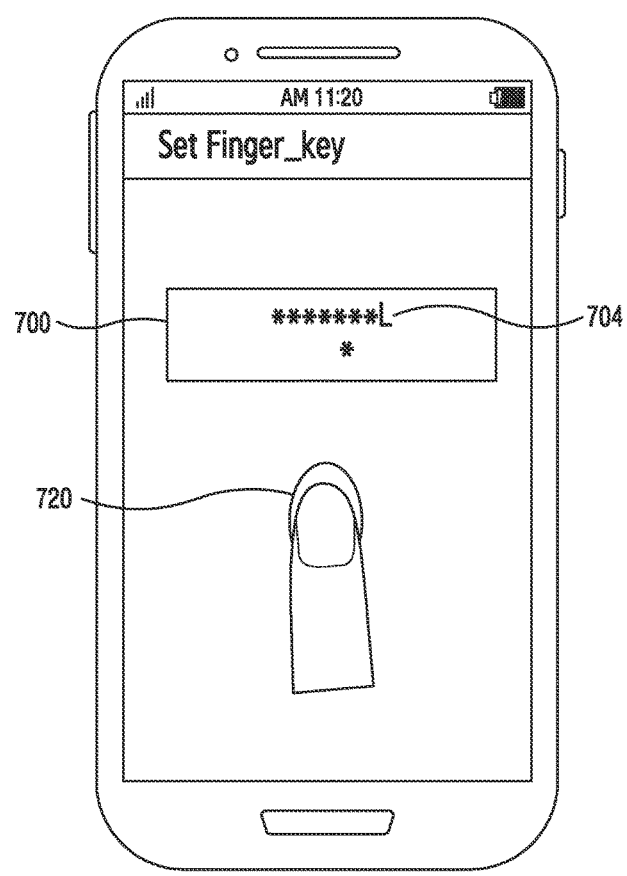

FIGS. 7A and 7B illustrate a configuration of a screen for creating a reference pattern, based on a touch area by a multi-touch, according to the embodiment of the present disclosure.

Referring to FIG. 7A, an electronic device (e.g., the electronic device 101) may display a reference pattern creation image on the display (e.g., the display 160). For example, the electronic device may include a pattern input area 700 that displays variables of the reference pattern for the unlocking in at least a partial area of the reference pattern creation image.

According to an embodiment of the present disclosure, if a multi-touch input is detected through the reference pattern creation image, the electronic device may compare the touch area of each touch region included in a multi-touch input 710 with a preset reference touch area to thereby separate the touch areas corresponding to the touch regions of the multi-touch input. For example, if the touch area of the first touch region of the sixth multi-touch input 710 is less than the reference touch area, and if the touch area of the second touch region is equal to or more than the reference touch area, the electronic device may display touch area information (e.g., a sign indicating a large touch area and a small touch area) of the touch regions of the multi-touch input 710 as a sixth variable (e.g., "SL") 702 of the reference pattern, in the pattern input area 700. For example, if the sixth touch input 710 is detected, the electronic device may display the touch area information of other touch inputs except for the touch area information 702 of the sixth touch input 710, using a uniform sign (e.g., "*"), in order to prevent other users from identifying the same. For example, if another touch input is not detected within a reference time from the detection time of the sixth touch input 710, the electronic device may change the touch area information 702 displayed in the pattern input area 700 into the uniform sign.

According to an embodiment of the present disclosure, the electronic device may display a graphic effect corresponding to the touch area of each touch region of the multi-touch input 710 in the corresponding touch region, in order for the user to recognize the touch area of the multi-touch input 710.

Referring to FIG. 7B, if a touch area of an eighth touch input 720 is equal to or more than the reference touch area, the electronic device may display touch area information (e.g., a sign indicating the large touch area) corresponding to the touch input 720 as an eighth variable (e.g., "L") 704 of the reference pattern, in the pattern input area 700.

According to an embodiment of the present disclosure, if a reference pattern creation completion event is detected, the electronic device may configure the pattern information displayed in the pattern input area 700 as the reference pattern.

According to various embodiments of the present disclosure, when the multi-touch input for creating the input pattern is detected, the electronic device may determine the form of the touch area information of the multi-touch input, which is to be added to the reference pattern, based on the predetermined priority of each direction (e.g., up, down, left, or right). For example, if the left direction is configured at a higher priority than the right direction, as shown in FIG. 7A, the electronic device may add the touch area information corresponding to the multi-touch input 710 in the form of "SL" 702, to the reference pattern. For example, if the right direction is configured at a higher priority than the left direction, the electronic device may add the touch area information corresponding to the multi-touch input 710 in the form of "LS," to the reference pattern FIGS. 8A and 8B illustrate a configuration of a screen for creating a reference pattern, based on a touch area and a touch movement in, according to the embodiment of the present disclosure.

Figure 8A:
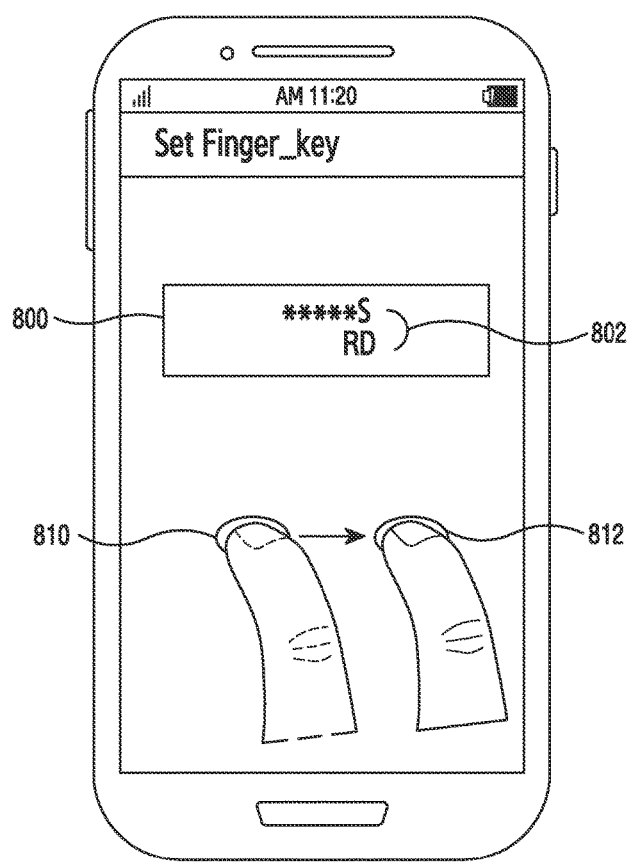
FIGS. 8A and 8B illustrate a configuration of a screen for creating a reference pattern, based on a touch area and a touch movement according to various embodiments of the present disclosure.

Referring to FIG. 8A, an electronic device (e.g., the electronic device 101) may display a reference pattern creation image on the display (e.g., the display 160). For example, the electronic device may include a pattern input area 800 that displays variables of the reference pattern for the unlocking, in at least a part of the reference pattern creation image.

According to an embodiment of the present disclosure, if a touch input is detected through the reference pattern creation image, the electronic device may compare the touch area of a touch input 810 with a preset reference touch area to thereby separate the touch area corresponding to the touch input. If a touch movement 812 occurs within a reference time from the detection time of a sixth touch input 810, the electronic device may display the touch area information (e.g., a sign representing the small touch area) corresponding to the sixth touch input 810, and the touch movement information (e.g., a sign indicating a drag to the right), as a sixth variable 802 (e.g., "SRD") of the reference pattern, in the pattern input area 800. For example, if the sixth touch input 810 is detected, the electronic device may display the touch area information of other touch inputs except for the touch area information of the sixth touch input 810 and touch movement information 802, using a uniform sign (e.g., "*"), in order to prevent other users from identifying the same. For example, if another touch input is not detected within a reference time from the detection time of the touch movement 812 of the sixth touch input 810, the electronic device may change the touch area information and the touch movement information 802, which are displayed in the pattern input area 800, into the uniform sign.

Figure 8B:
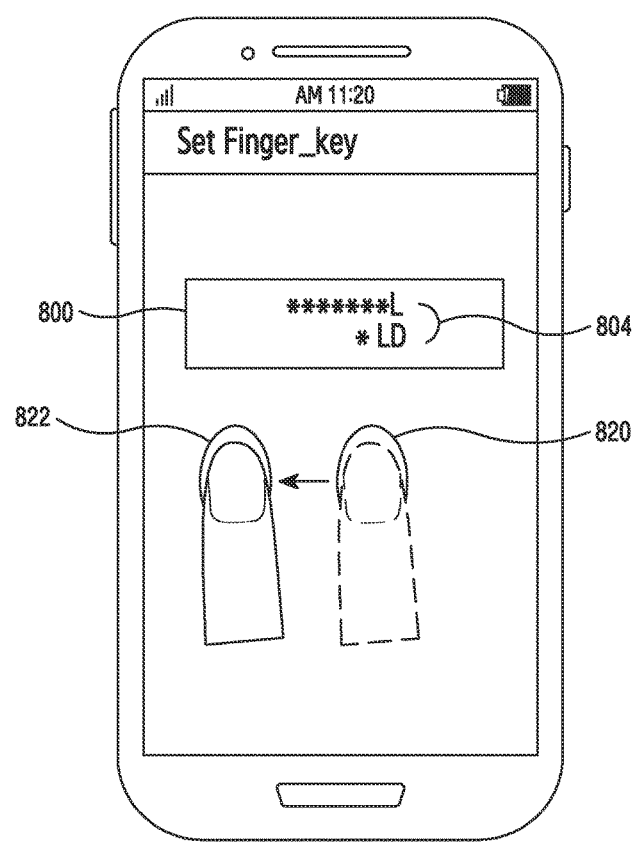

Referring to FIG. 8B, if a touch input is detected through the reference pattern creation image, the electronic device may compare the touch area of a touch input 820 with a preset reference touch area to thereby separate the touch area corresponding to the touch input. As shown in FIG. 8B, if a touch movement 822 occurs within a reference time from the detection time of the eighth touch input 820, the electronic device may display the touch area information (e.g., a sign representing the large touch area) corresponding to the eighth touch input 820, and the touch movement information (e.g., a sign indicating a drag to the left), as an eighth variable 804 (e.g., ladder logic diagram (LLD)) of the reference pattern, in the pattern input area 800. For example, if the eighth touch input 820 is detected, the electronic device may display the touch area information of other touch inputs except for the touch area information of the touch input 820 and the touch movement information 804, using a uniform sign (e.g., "*"), in order to prevent other users from identifying the same. For example, if another touch input is not detected within a reference time from the detection time of the touch movement 822 of the eighth touch input 820, the electronic device may change the touch area information and the touch movement information 804, which are displayed in the pattern input area 800, into the uniform sign.

According to an embodiment of the present disclosure, the electronic device may create a haptic effect or a graphic effect, which corresponds to the touch area (e.g., a small touch area or a large touch area) of the touch input 810 or 820, in order for the user to recognize the touch area of the touch input 810 or 820.

According to an embodiment of the present disclosure, if a reference pattern creation completion event is detected, the electronic device may configure the pattern information displayed in the pattern input area 800 as the reference pattern.

Figure 9:
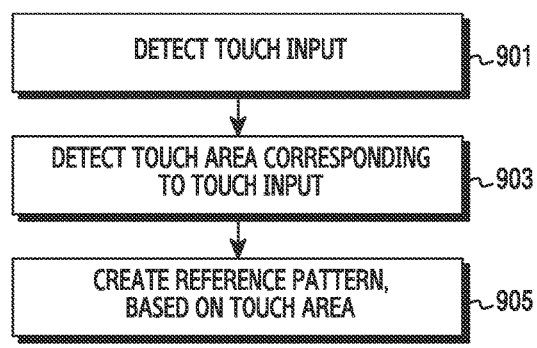
FIG. 9 is a flowchart for creating a reference pattern, based on a touch area in an electronic device according to various embodiments of the present disclosure.

FIG. 9 is a flowchart for creating a reference pattern, based on a touch area in an electronic device, according to the embodiment of the present disclosure.

Referring to FIG. 9, in operation 901, an electronic device (e.g., the electronic device 101) may detect a touch input. For example, the electronic device may detect the touch input while the reference pattern creation image is displayed.

In operation 903, the electronic device may detect the touch area corresponding to the touch input. For example, if a multi-touch is detected, the electronic device may detect the touch area corresponding to each touch of the multi-touch input. For example, the electronic device may detect the touch area of the touch input, or the touch area and the movement thereof.

In operation 905, the electronic device may create a reference pattern for the unlocking, based on the touch area. For example, if another touch input is not detected within a reference time from the detection of the touch input, the electronic device may recognize that the input for creating the reference pattern has been completed. The electronic device may configure the touch area information of the touch inputs, which is displayed in the pattern input area 600 or 700, or the touch area information and the touch movement information, which are displayed in the pattern input area 800, as the reference pattern. For example, the input corresponding to the completion of the pattern input (e.g., the selection of a completion button or a completion icon) is detected through an input/output interface 150, the electronic device may configure the touch area information of the touch inputs, which is displayed in the pattern input area 600 or 700, or the touch area information and the touch movement information, which are displayed in the pattern input area 800, as the reference pattern In various embodiments of the present disclosure, the electronic device may divide the touch area corresponding to the touch input into several areas to then provide the locking service with respect to the same.

In various embodiments of the present disclosure, the electronic device may create at least one of a graphic effect (e.g., the pattern input area), a haptic effect, or a sound effect, which correspond to the touch area of the touch input.

According to various embodiments of the present disclosure, the electronic device may create a user input pattern for the unlocking, using the touch area, or the touch area and the touch movement, which correspond to at least one touch input detected through the touch screen. The electronic device may unlock the electronic device, based on the comparison result of the user input pattern and the reference pattern created through FIG. 9. For example, if the user input pattern matches the reference pattern, the electronic device may unlock the electronic device. For example, if the user input pattern does not match the reference pattern, the electronic device may display a locking image for the resetting of the user input pattern. According to an embodiment, the electronic device may display the user input pattern information on the display 160.

FIGS. 10A to 10D illustrate a configuration of a screen for creating a reference pattern, based on a touch shape, according to the embodiment of the present disclosure.

Figure 10A:
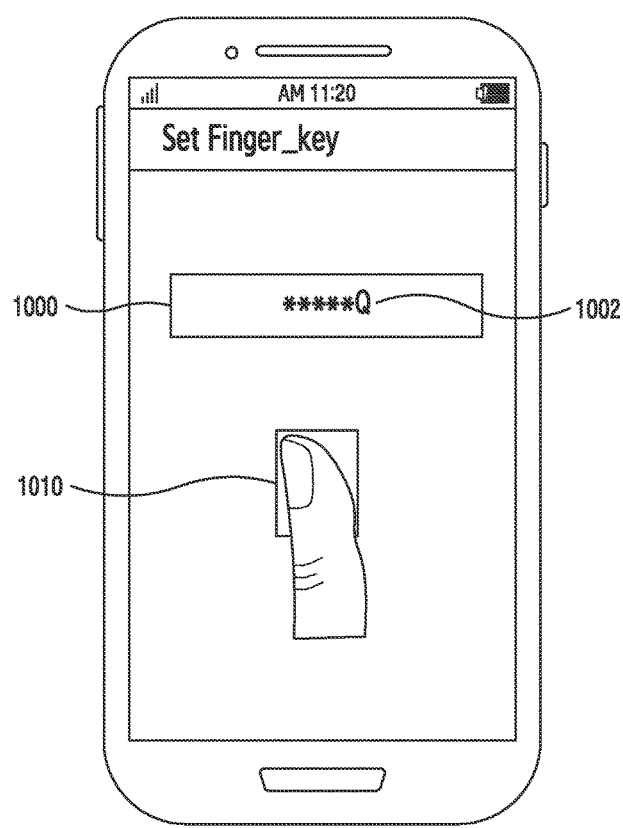
FIGS. 10A, 10B, 10C, and 10D illustrate a configuration of a screen for creating a reference pattern, based on a touch shape according to various embodiments of the present disclosure.

Referring to FIG. 10A, an electronic device (e.g., the electronic device 101) may display a reference pattern creation image on the display (e.g., the display 160). For example, the electronic device may include a pattern input area 1000 that displays variables of the reference pattern for the unlocking, in at least a part of the reference pattern creation image.

According to an embodiment of the present disclosure, if a touch input is detected through the reference pattern creation image, the electronic device may display touch shape information (e.g., a sign indicating a rectangle) corresponding to a sixth touch input 1010 as a sixth variable 1002 (e.g., "Q") of the reference pattern, in the pattern input area 1000. For example, if the sixth touch input 1010 is detected, the electronic device may display touch shape information of other touch inputs except for the touch shape information 1002 of the sixth touch input 1010, using a uniform sign (e.g., "*"), in order to prevent other users from identifying the same.

Figure 10B:
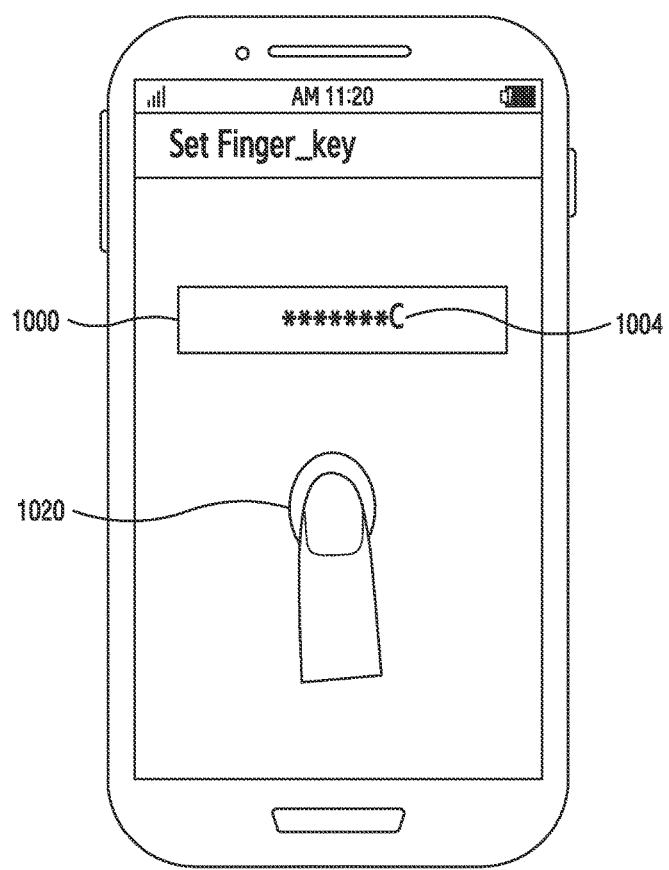
Figure 10C:
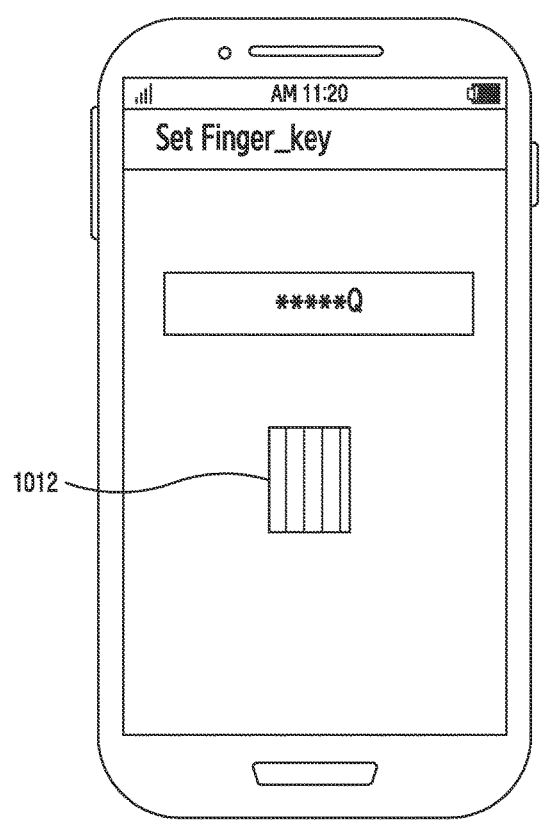

Referring to FIG. 10C, the electronic device may display a graphic effect 1012 corresponding to the touch shape (e.g., a rectangle) of the touch input 1010, in order for the user to recognize the touch shape of the touch input 1010.

Referring to FIG. 10B, the electronic device may display touch shape information (e.g., a sign indicating a circle) corresponding to the eighth touch input 1020 as the eighth variable (e.g., "C") 1004 of the reference pattern, in the pattern input area 1000. For example, if the eighth touch input 1020 is detected, the electronic device may display the touch shape information of other touch inputs except for the touch shape information 1004 of the eighth touch input 1020, using a uniform sign (e.g., "*"), in order to prevent other users from identifying the same. For example, if another touch input is not detected within a reference time from the detection time of the eighth touch input 1020, the electronic device may change the touch shape information 1004 displayed in the pattern input area 1000 into the uniform sign.

Figure 10D:
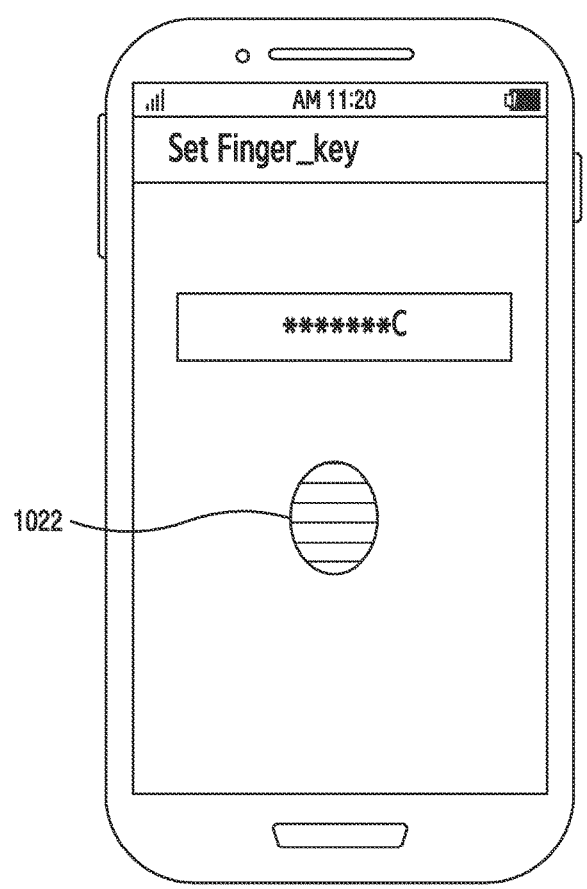

Referring to FIG. 10D, the electronic device may display a graphic effect 1022 corresponding to the touch shape (e.g., a circle) of the touch input 1020, in order for the user to recognize the touch shape of the touch input 1020.

According to an embodiment of the present disclosure, if a reference pattern creation completion event is detected, the electronic device may configure the pattern information displayed in the pattern input area 1000 as the reference pattern. For example, if another touch input is not detected within a reference time from the detection time of the touch input, the electronic device may recognize that the configuration of the reference pattern has been completed. For example, if the electronic device detects the selection of an icon or a menu corresponding to the completion of the reference pattern creation, the electronic device may recognize that the configuration of the reference pattern has been completed.

Figure 11A:
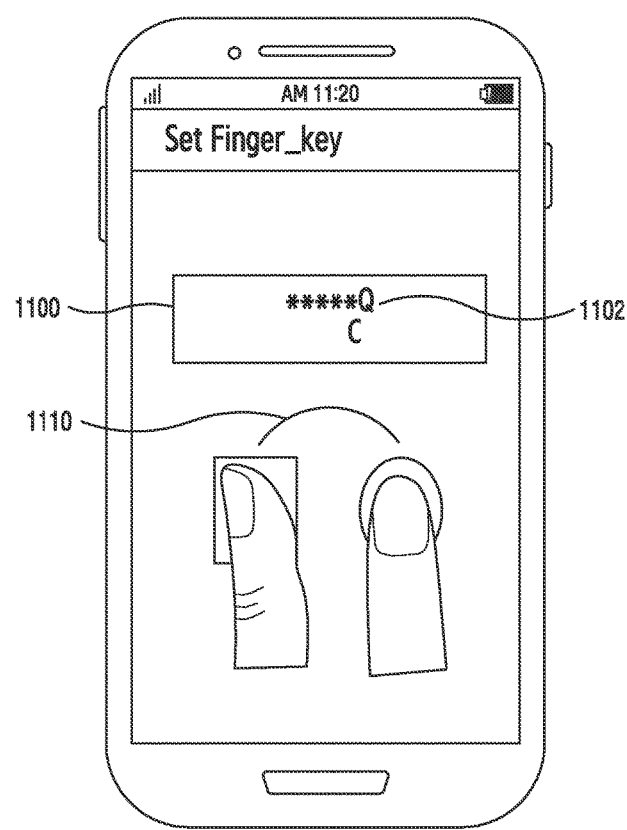
FIGS. 11A and 11B illustrate a configuration of a screen for creating a reference pattern, based on a touch shape by a multi-touch according to various embodiments of the present disclosure.
Figure 11B:
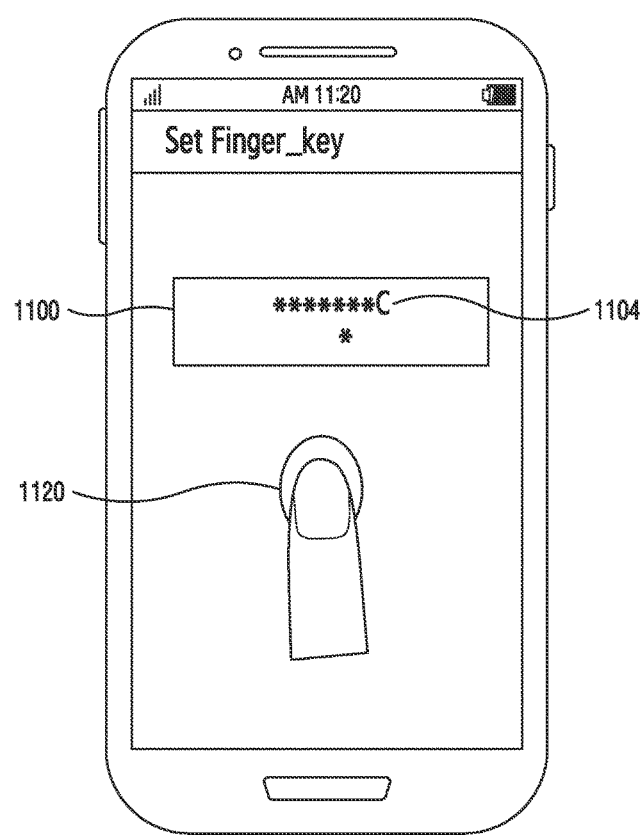

FIGS. 11A and 11B illustrate a configuration of a screen for creating a reference pattern, based on a touch shape by a multi-touch, according to the embodiment of the present disclosure.

Referring to FIG. 11A, an electronic device (e.g., the electronic device 101) may display a reference pattern creation image on the display (e.g., the display 160). For example, the electronic device may include a pattern input area 1100 that displays variables of the reference pattern for the unlocking, in at least a part of the reference pattern creation image.

According to an embodiment of the present disclosure, if a multi-touch input is detected through the reference pattern creation image, the electronic device may display touch shape information (e.g., a sign indicating a rectangle and a circle) corresponding to each touch region of a sixth multi-touch input 1110 as the sixth variable 1102 (e.g., "QC") of the reference pattern, in a pattern input area 1100. For example, if the sixth touch input 1110 is detected, the electronic device may display touch shape information of other touch inputs except for a touch shape information 1102 of the sixth touch input 1110, using a uniform sign (e.g., "*"), in order to prevent other users from identifying the same. For example, if another touch input is not detected within a reference time from the detection time of the sixth touch input 1110, the electronic device may change the touch shape information 1102 displayed in the pattern input area 1100 into the uniform sign.

According to an embodiment of the present disclosure, the electronic device may display a graphic effect corresponding to each touch shape (e.g., a rectangle and a circle) of the multi-touch input 1110 in touch region, in order for the user to recognize the touch shape of the multi-touch input 1110.

Referring to FIG. 11B, the electronic device may display the touch shape information (e.g., a sign indicating a circle) corresponding to the eighth touch input 1120 as an eighth variable (e.g., "C") 1104 of the reference pattern, in the pattern input area 1100.

According to an embodiment of the present disclosure, if a reference pattern creation completion event is detected, the electronic device may configure the pattern information displayed in the pattern input area 1100 as the reference pattern.

According to various embodiments of the present disclosure, when the multi-touch input for creating the input pattern is detected, the electronic device may determine the form of the touch shape information of the multi-touch input, which is to be added to the reference pattern, based on the predetermined priority of each direction (e.g., up, down, left, or right). For example, if the left direction is configured at a higher priority than the right direction, as shown in FIG. 11A, the electronic device may add the touch shape information corresponding to the multi-touch input 1110 in the form of "QC" 1102, to the reference pattern. For example, if the right direction is configured at a higher priority than the left direction, the electronic device may add the touch shape information corresponding to the multi-touch input 1110 in the form of "CQ," to the reference pattern.

Figure 12A:
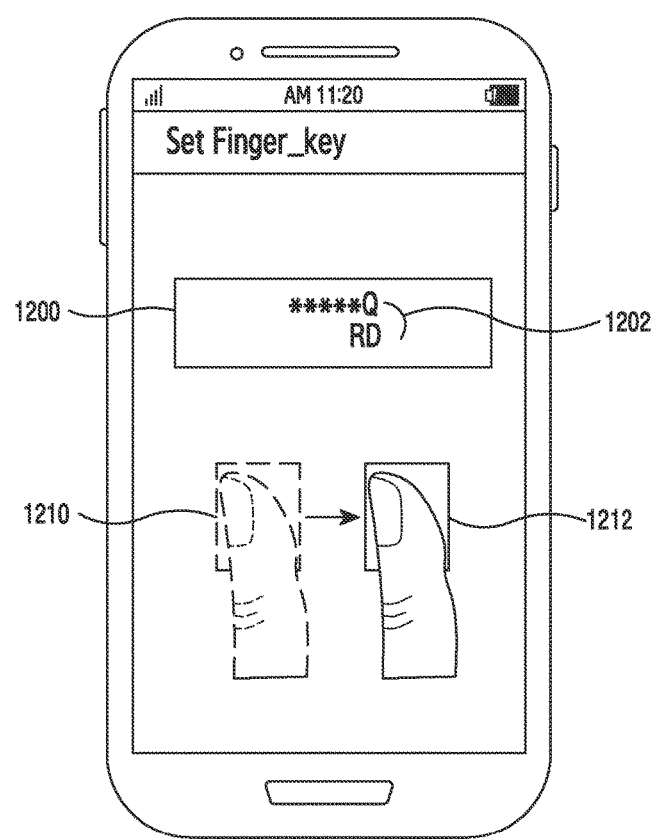
FIGS. 12A and 12B illustrate a configuration of a screen for creating a reference pattern, based on a touch shape and a touch movement according to various embodiments of the present disclosure.
Figure 12B:
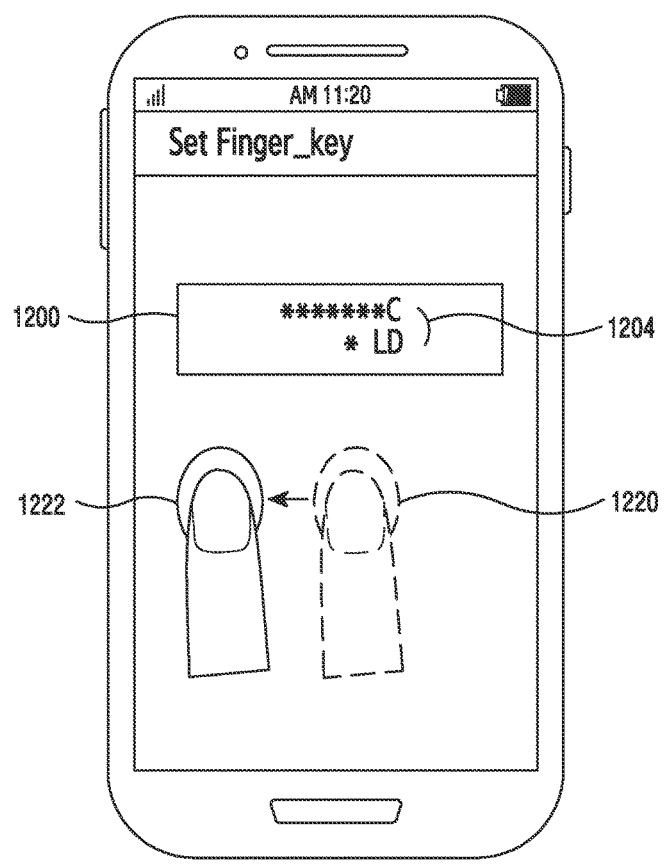

FIGS. 12A and 12B illustrate a configuration of a screen for creating a reference pattern, based on a touch shape and a touch movement, according to the embodiment of the present disclosure.

Referring to FIG. 12A, an electronic device (e.g., the electronic device 101) may display a reference pattern creation image on the display (e.g., the display 160). For example, the electronic device may include a pattern input area 1200 that displays variables of the reference pattern for the unlocking, in at least a part of the reference pattern creation image.

I a touch movement 1212 occurs within a reference time from the detection time of a sixth touch input 1210, the electronic device may display the touch shape information (e.g., a sign representing a rectangle) corresponding to the sixth touch input 1210, and the touch movement information (e.g., a sign indicating a drag to the right), as a sixth variable 1202 (e.g., "QRD") of the reference pattern, in the pattern input area 1200. For example, if the sixth touch input 1210 is detected, the electronic device may display the touch shape information of other touch inputs except for the touch shape information and the touch movement information 1202 of the sixth touch input 1210, using a uniform sign (e.g., "*"), in order to prevent other users from identifying the same. For example, if another touch input is not detected within a reference time from the detection time of the touch movement 1212 of the sixth touch input 1210, the electronic device may change the touch shape information and the touch movement information 1202, which are displayed in the pattern input area 1200, into the uniform sign.

According to an embodiment of the present disclosure, as shown in FIG. 12B, if a touch movement 1222 occurs within a reference time from the detection time of the eighth touch input 1220, the electronic device may display touch shape information (e.g., a sign representing a circle) corresponding to the eighth touch input 1220, and touch movement information (e.g., a sign indicating a drag to the left), as the eighth variable 1204 (e.g., "CLD") of the reference pattern, in the pattern input area 1200. For example, if the eighth touch input 1220 is detected, the electronic device may display touch shape information of other touch inputs except for the touch shape information and the touch movement information 1204 of the eighth touch input 1220, using a uniform sign (e.g., "*"), in order to prevent other users from identifying the same. For example, if another touch input is not detected within a reference time from the detection time of the touch movement 1222 of the eighth touch input 1220, the electronic device may change the touch shape information and the touch movement information 1204, which are displayed in the pattern input area 1200, into the uniform sign.

According to an embodiment of the present disclosure, the electronic device may create a haptic effect or a graphic effect, which correspond to the touch shape (e.g., a rectangle or a circle) of the touch input 1210 or 1220, in order for the user to recognize the touch shape of the touch input 1210 or 1220.

According to an embodiment of the present disclosure, if a reference pattern creation completion event is detected, the electronic device may configure the pattern information displayed in the pattern input area 1200 as the reference pattern.

Figure 13:
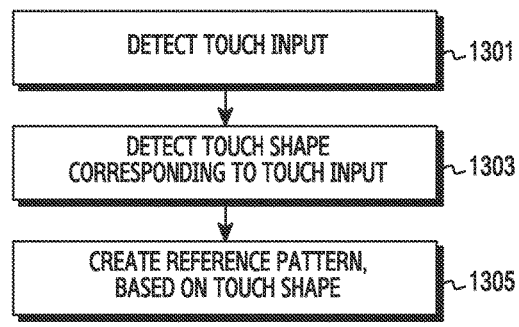
FIG. 13 is a flowchart for creating a reference pattern, based on a touch shape in an electronic device according to various embodiments of the present disclosure.

FIG. 13 is a flowchart for creating a reference pattern, based on a touch shape in an electronic device according to the embodiment of the present disclosure.

Referring to FIG. 13, in operation 1301, an electronic device (e.g., the electronic device 101) may detect a touch input. For example, the electronic device may detect the touch input while the reference pattern creation image is displayed.

In operation 1303, the electronic device may detect the touch shape corresponding to the touch input. For example, if a multi-touch is detected, the electronic device may detect the touch shape corresponding to each touch of the multi-touch input. For example, the electronic device may detect the touch shape of the touch input, or the touch shape and the movement thereof. For example, when the electronic device uses a capacitive touch type, the electronic device may detect the touch shape formed by one or more touch coordinates in which a change in the capacitance is detected due to the touch input. For example, in the case of a pressure-sensitive touch type, the electronic device may extract one or more touch coordinates of the touch detection, based on a change in the resistance due to the touch input. The electronic device may detect the touch shape formed by one or more of the extracted touch coordinates.

In operation 1305, the electronic device may create a reference pattern for the unlocking, based on the touch shape. For example, if another touch input is not detected within a reference time from the detection of the touch input, the electronic device may recognize that the input for creating the reference pattern has been completed. The electronic device may configure the touch shape information of the touch inputs, which is displayed in the pattern input area 1000 or 1100, or the touch shape information and the touch movement information, which are displayed in the pattern input area 1200, as the reference pattern. For example, an input corresponding to the completion of the pattern input (e.g., the selection of a completion button or a completion icon) is detected through the input/output interface 150, the electronic device may configure the touch shape information of the touch inputs, which is displayed in the pattern input area 1000 or 1100, or the touch shape information and the touch movement information, which are displayed in the pattern input area 1200, as the reference pattern In various embodiments of the present disclosure, the electronic device may divide the touch shape corresponding to the touch input into several shapes to then provide the locking service with respect to the same.

In various embodiments of the present disclosure, the electronic device may create at least one of a graphic effect (e.g., the pattern input area), a haptic effect, or a sound effect, which correspond to the touch shape of the touch input.

According to various embodiments of the present disclosure, the electronic device may create a user input pattern for the unlocking, using the touch shape, or the touch shape and the touch movement, which correspond to at least one touch input detected through the touch screen. The electronic device may unlock the electronic device, based on the comparison result of the user input pattern and the reference pattern created through FIG. 13. For example, if the user input pattern matches the reference pattern, the electronic device may unlock the electronic device. For example, if the user input pattern does not match the reference pattern, the electronic device may display a locking image for the resetting of the user input pattern. According to an embodiment, the electronic device may display the user input pattern information on the display 160.

Figure 14A:
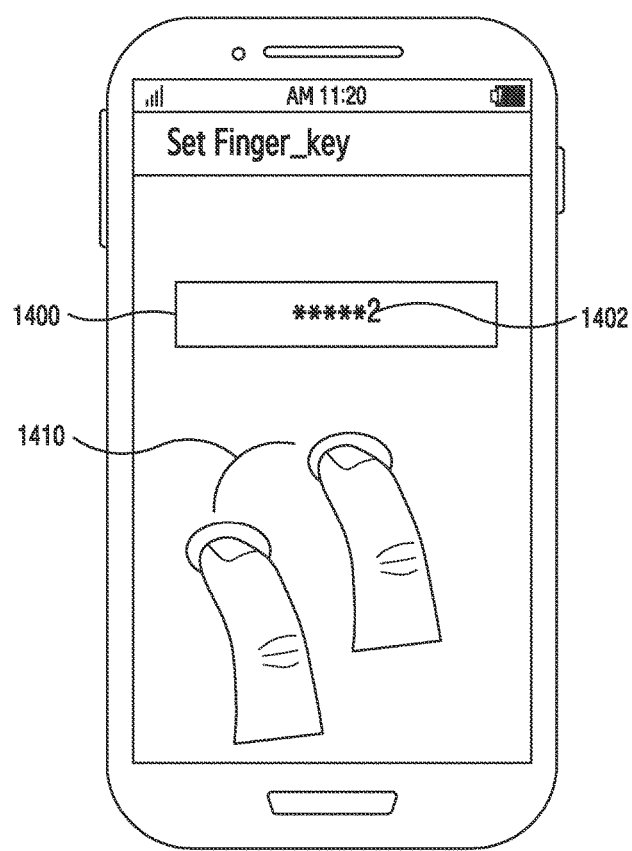
FIGS. 14A and 14B illustrate a configuration of a screen for creating a reference pattern, based on the number of touches in an electronic device according to various embodiments of the present disclosure.
Figure 14B:
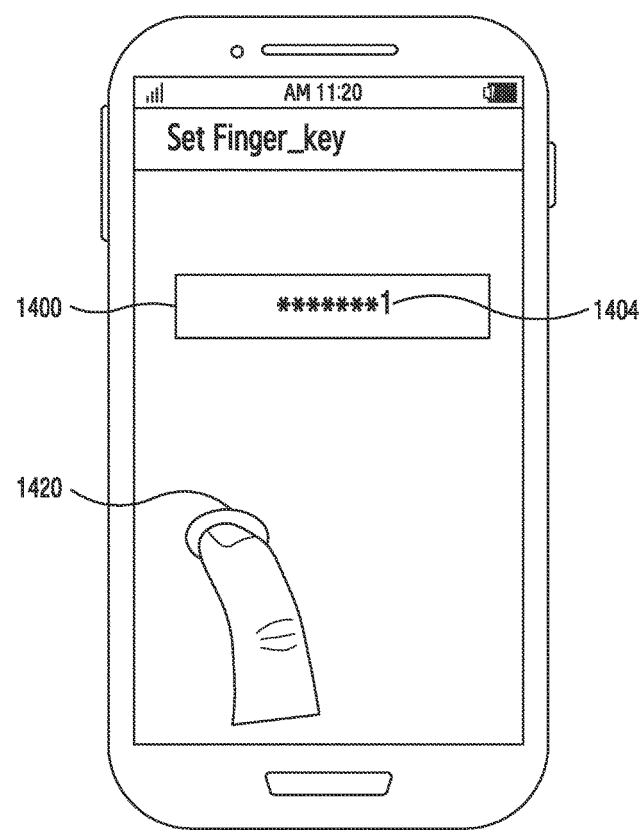

FIGS. 14A and 14B illustrate a configuration of a screen for creating a reference pattern, based on the number of touches in the electronic device according to various embodiments of the present disclosure.

Referring to FIG. 14A, an electronic device (e.g., the electronic device 101) may display a reference pattern creation image on the display (e.g., the display 160). For example, the electronic device may include a pattern input area 1400 that displays variables of the reference pattern for the unlocking, in at least a part of the reference pattern creation image.

The electronic device may display the number of touches (e.g., a sign indicating two) corresponding to a sixth touch input 1410 as the sixth variable 1402 (e.g., "2") of the reference pattern, in a pattern input area 1400. For example, if the sixth touch input 1410 is detected, the electronic device may display touch number information of other touch inputs except for the touch number information 1402 of the sixth touch input 1410, using a uniform sign (e.g., "*"), in order to prevent other users from identifying the same. For example, if another touch input is not detected within a reference time from the detection time of the sixth touch input 1410, the electronic device may change the touch number information 1402 displayed in the pattern input area 1400 into the uniform sign.

Referring to FIG. 14B, the electronic device may display the touch number information (e.g., a sign indicating one) corresponding to an eighth touch input 1420 as an eighth variable (e.g., "1") 1404 of the reference pattern, in the pattern input area 1400. For example, the electronic device may display touch number information of other touch inputs except for the touch number information 1404 of the eighth touch input 1420 using a uniform sign (e.g., "*"), in order to prevent other users from identifying the same. For example, if another touch input is not detected within a reference time from the detection time of the eighth touch input 1420, the electronic device may change the touch number information 1404 displayed in the pattern input area 1400 into the uniform sign.

Figure 15:
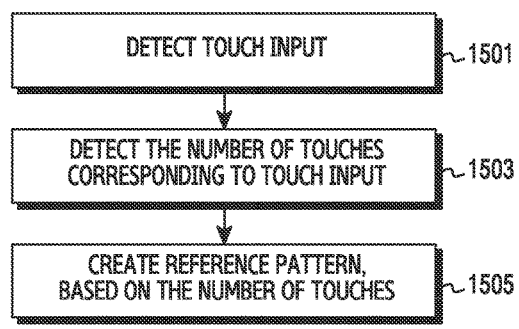
FIG. 15 is a flowchart for creating a reference pattern, based on the number of touches in an electronic device according to various embodiments of the present disclosure.

FIG. 15 is a flowchart for creating a reference pattern, based on the number of touches in an electronic device, according to the embodiment of the present disclosure.

Referring to FIG. 15, in operation 1501, an electronic device (e.g., the electronic device 101) may detect a touch input. For example, the electronic device may detect the touch input while the reference pattern creation image is displayed.

In operation 1503, the electronic device may detect the number of touches corresponding to the touch input.

In operation 1505, the electronic device may create a reference pattern for the unlocking, based on the number of touches. For example, if another touch input is not detected within a reference time from the detection of the touch input, the electronic device may recognize that the input for creating the reference pattern has been completed. The electronic device may configure the touch number information of the touch inputs, which is displayed in the pattern input area 1400, as the reference pattern. For example, an input corresponding to the completion of the pattern input (e.g., the selection of a completion button or a completion icon) is detected through the input/output interface 150, the electronic device may configure the touch number information of the touch inputs, which is displayed in the pattern input area 1400, as the reference pattern According to various embodiments of the present disclosure, the electronic device may create a user input pattern for the unlocking, using the number of touches corresponding to at least one touch input detected through the touch screen. The electronic device may unlock the electronic device, based on the comparison result of the user input pattern and the reference pattern created through FIG. 15. For example, if the user input pattern matches the reference pattern, the electronic device may unlock the electronic device. For example, if the user input pattern does not match the reference pattern, the electronic device may display a locking image for the resetting of the user input pattern. According to an embodiment, the electronic device may display the user input pattern information on the display 160.

According to various embodiments of the present disclosure, an operating method of an electronic device may include: detecting at least one touch input; detecting at least one of a touch area, a touch shape, or the number of touches, which correspond to each touch input; and creating a reference pattern for the unlocking, based on at least one of the touch area, the touch shape, or the number of touches, which correspond to each touch input.

In various embodiments of the present disclosure, the creating of the reference pattern may include creating variables of the reference pattern corresponding to the touch input, based on at least one of the touch area, the touch shape, or the number of touches, which correspond to the touch input detected through a touch screen.

In various embodiments, the creating of the reference pattern may include, in creating the reference pattern, based on at least one of the touch area or the touch shape, when a multi-touch input is detected, creating variables of the reference pattern corresponding to the multi-touch input, based on at least one of the touch area or the touch shape, which correspond to each touch region detected by the multi-touch input.

In various embodiments of the present disclosure, the method may further include detecting a touch movement corresponding to the touch input, and the creating of the reference pattern may include creating variables of the reference pattern corresponding to the touch input by additionally using the detected touch movement, based on at least one of the touch area, the touch shape, or the number of touches, which correspond to the touch input.

In various embodiments of the present disclosure, the method may further include creating at least one of a haptic effect or a graphic effect to correspond to at least one of the touch area, the touch shape, or the number of touches before creating the reference pattern.

In various embodiments of the present disclosure, the method may further include: detecting at least one touch input; detecting at least one of a touch area, a touch shape, or the number of touches, which correspond to each touch input; creating a user input pattern, based on at least one of the touch area, the touch shape, or the number of touches, which correspond to each touch input; and unlocking the electronic device, based on the comparison result of the user input pattern and the reference pattern.

In various embodiments of the present disclosure, the unlocking of the electronic device may include: if the user input pattern matches the reference pattern, unlocking the electronic device; and if the user input pattern does not match the reference pattern, maintaining the electronic device in the locked state.

According to various embodiments of the present disclosure, an operating method of an electronic device (e.g., the electronic device 101 of FIG. 1) may include: detecting a plurality of touch inputs; detecting a touch area corresponding to each touch input; detecting an average of the touch areas corresponding to the plurality of touch inputs; and creating a reference area for separating the touch area to create an input pattern corresponding to the unlocking of the electronic device, based on the average of the touch areas.

In various embodiments of the present disclosure, the method may further include: detecting at least one touch input; comparing the touch area corresponding to each touch input with the reference area; separating the type of touch area corresponding to each touch input, based on the comparison result; and creating a reference pattern for the unlocking, based on the type of touch area corresponding to each touch input.

In various embodiments of the present disclosure, the method may further include: detecting at least one touch input; comparing the touch area corresponding to each touch input with the reference area; separating the type of touch area corresponding to each touch input, based on the comparison result; creating a user input pattern, based on the type of touch area corresponding to each touch input; and unlocking the electronic device, based on the comparison result of the user input pattern and the reference pattern.

Figure 16:
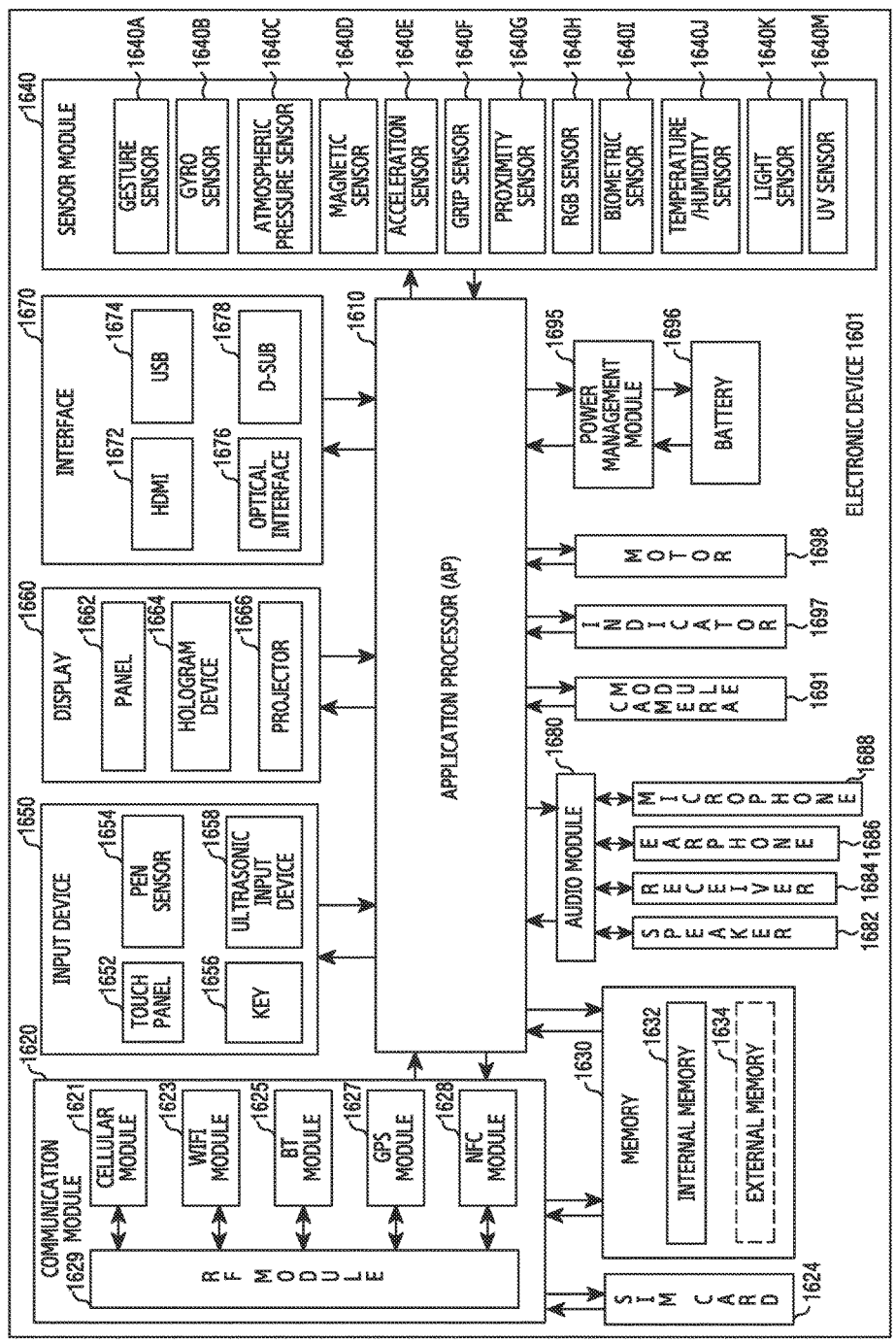
FIG. 16 is a block diagram of an electronic device according to various embodiments of the present disclosure.

FIG. 16 is a block diagram of an electronic device in accordance with the embodiment of the present disclosure.

The electronic device, for example, may constitute a part of or all of the electronic device 101 shown in FIG. 1.

Referring to FIG. 16, the electronic device 1601 may include one or more APs 1610, a communication module 1620, a subscriber identification module (SIM) card 1624, a memory 1630, a sensor module 1640, an input device 1650, a display 1660, an interface 1670, an audio module 1680, an image sensor module 1691, a power management module 1695, a battery 1696, an indicator 1697, and a motor 1698.

The AP 1610 may control a multitude of hardware or software elements connected with the AP 1610 and perform the processing of various pieces of data including multimedia data and the calculation, by driving an OS or application programs. The AP 1610 may be implemented with, for example, a system on chip (SoC). According to an embodiment, the AP 1610 may further include a graphic processing unit (GPU).

The communication module 1620 (e.g., the communication interface 170) may transmit or receive data in communication between the electronic device 1601 (e.g., the electronic device 101) and other electronic devices connected thereto through a network. According to an embodiment of the present disclosure, the communication module 1620 may include a cellular module 1621, a Wi-Fi module 1623, a BT module 1625, a GPS module 1627, an NFC module 1628, or a radio frequency (RF) module 1629.

The cellular module 1621 may provide services of a voice call, a video call and text messaging, or an Internet service through communication networks (e.g., LTE, LTE-A, CDMA, WCDMA, UMTS, WiBro, or GSM). In addition, the cellular module 1621 may perform identification and authentication of the electronic device in the communication network by using a SIM (e.g., the SIM card 1624). According to an embodiment of the present disclosure, the cellular module 1621 may perform at least some of the functions provided by the AP 1610. For example, the cellular module 1621 may conduct at least some of multimedia control functions.

According to an embodiment, of the present disclosure the cellular module 1621 may include a (CP). In addition, the cellular module 1621 may be implemented with, for example, an SoC. Although elements, such as the cellular module 1621 (e.g., the CP), the memory 1630, or the power management module 1695 are illustrated to be separated from the AP 1610 in FIG. 16, according to an embodiment of the present disclosure, the AP 1610 may be implemented to include at least some (e.g., the cellular module 1621) of the elements mentioned above.

According to an embodiment of the present disclosure, the AP 1610 or the cellular module 1621 (e.g., the CP) may load instructions or data received from at least one of the non-volatile memories or other elements, which are connected with the AP 1610 or cellular module 1621, in a volatile memory, and may process the same. In addition, the AP 1610 or the cellular module 1621 may store data that is received or created from or by at least one of other elements in a non-volatile memory.

Each of the Wi-Fi module 1623, the BT module 1625, the GPS module 1627, or the NFC module 1628 may include, for example, a processor for processing data transmitted and received through the corresponding module. Although the cellular module 1621, the Wi-Fi module 1623, the BT module 1625, the GPS module 1627, or the NFC module 1628 are illustrated to be separated from each other in FIG. 16, according to another embodiment of the present disclosure, at least some (e.g., two or more) of the cellular module 1621, the Wi-Fi module 1623, the BT module 1625, the GPS module 1627, or the NFC module 1628 may be included in a single integrated chip (IC) or in a single IC package. For example, at least some (e.g., the CP corresponding to the cellular module 1621 and a Wi-Fi processor corresponding to the Wi-Fi module 1623) of processors corresponding to each of the cellular module 1621, the Wi-Fi module 1623, the BT module 1625, the GPS module 1627, or the NFC module 1628 may be implemented with a single SoC.

The RF module 1629 may transmit and receive data, for example, RF signals. Although it is not shown in the drawing, the RF module 1629 may include, for example, a transceiver, a power amp module (PAM), a frequency filter, a low noise amplifier (LNA), or the like. In addition, the RF module 1629 may further include components, such as conductors or cables, for transmitting and receiving electromagnetic waves through a free space in wireless communication. Although the cellular module 1621, the Wi-Fi module 1623, the BT module 1625, the GPS module 1627 and the NFC module 1628 share a single RF module 1629 in FIG. 16, according to an embodiment of the present disclosure, at least one of the cellular module 1621, the Wi-Fi module 1623, the BT module 1625, the GPS module 1627 and the NFC module 1628 may transmit and receive RF signals through a separated RF module.

According to an embodiment of the present disclosure, the RF module 1629 may include at least one of a main antenna and a sub antenna, which are functionally connected with the electronic device 1601. The communication module 1620 may support a multiple input multiple output (MIMO) service, such as a diversity, by using the main antenna and the sub antenna.

The SIM cards 1624 may include a card adopting a SIM, and may be inserted into a slot that is formed at a specific position of the electronic device. The SIM card 1624 may include an inherent identification information (e.g., an integrated circuit card identifier (ICCID)) or subscriber information (e.g., an international mobile subscriber identity (IMSI)).

The memory 1630 may include an internal memory 1632 or an external memory 1634. The internal memory 1632, for example, may include at least one of a volatile memory (e.g., a dynamic random access memory (DRAM), a static RAM (SRAM), a synchronous dynamic RAM (SDRAM), or the like) or a non-volatile memory (e.g., an one time programmable read only memory (OTPROM), a programmable ROM (PROM), an erasable and programmable ROM (EPROM), an electrically erasable and programmable ROM (EEPROM), a mask ROM, a flash ROM, a not and (NAND) flash memory, a not or (NOR) flash memory, or the like).

According to an embodiment of the present disclosure, the internal memory 1632 may be a solid state drive (SSD). The external memory 1634 may further include a flash drive, for example, a compact flash (CF), a secure digital (SD), a micro-SD, a mini-SD, an extreme digital (xD), a memory stick, or the like. The external memory 1634 may be functionally connected with the electronic device 1601 through various interfaces. According to an embodiment of the present disclosure, the electronic device 1601 may further include a storage device (or a storage medium), such as a hard drive.

The sensor module 1640 may measure physical quantities and detect an operation state of the electronic device 1601, to thereby convert the measured or detected information to electric signals. The sensor module 1640 may include at least one of, for example, a gesture sensor 1640A, a gyro-sensor 1640B, a barometer sensor 1640C, a magnetic sensor 1640D, an acceleration sensor 1640E, a grip sensor 1640F, a proximity sensor 1640G, a color sensor 1640H (e.g., a red-green-blue (RGB) sensor), a bio sensor 1640I, a temperature/humidity sensor 1640J, an illuminance sensor 1640K, or an ultra violet (UV) sensor 1640M. Alternatively or additionally, the sensor module 1640 may further include, for example, an E-nose sensor (not shown), an electromyography sensor (EMG) (not shown), an electroencephalogram sensor (EEG) (not shown), an electrocardiogram sensor (ECG) (not shown), an infrared (IR) sensor (not shown), an iris sensor (not shown), or a fingerprint sensor (not shown), or the like. The sensor module 1640 may further include a control circuit for controlling at least one sensor included therein.

The input device 1650 may include a touch panel 1652, a (digital) pen sensor 1654, keys 1656, or an ultrasonic input device 1658. The touch panel 1652 may detect a touch input in at least one of, for example, a capacitive type, a pressure type, an infrared type, or an ultrasonic type. In addition, the touch panel 1652 may further include a control circuit. In the case of a capacitive type, a physical contact or proximity may be detected. The touch panel 1652 may further include a tactile layer. In this case, the touch panel 1652 may provide a user with a tactile reaction.

The (digital) pen sensor 1654, for example, may be implemented in a method that is identical or similar to the reception of a user's touch input, or by using a separate recognition sheet. The keys 1656 may include, for example, physical buttons, optical keys, or a keypad. The ultrasonic input device 1658 detects acoustic waves with a microphone in the electronic device 1601 through an input means that generates ultrasonic signals to thereby identify data, and it may recognize wireless signals. According to an embodiment of the present disclosure, the electronic device 1601 may receive a user input from external devices (e.g., computers, or servers) by using the communication module 1620, which are connected with the communication module 1620.

The display 1660 (e.g., the display 160) may include a panel 1662, a hologram device 1664, or a projector 1666. The panel 1662 may be, for example, a LCD, an active-matrix OLED (AM-OLED), or the like. The panel 1662, for example, may be implemented to be flexible, transparent or wearable. The panel 1662 may be configured with the touch panel 1652 as a single module. The hologram device 1664 may display 3D images in the air by using interference of light. The projector 1666 may display images by projecting light onto a screen. The screen may be provided, for example, inside or outside the electronic device 1601. According to an embodiment of the present disclosure, the display 1660 may further include a control circuit for controlling the panel 1662, the hologram device 1664, or the projector 1666.

The interface 1670 may include, for example, a HDMI 1672, a USB 1674, an optical interface 1676, or a D-sub-miniature (D-sub) 1678. Additionally or alternatively, the interface 1670 may include, for example, a mobile high-definition link (MHL) interface, an SD card/multi-media card (MMC) interface, or an infrared data association (IrDA) standard interface.

The audio module 1680 may convert a sound into an electric signal, and vice versa. For example, the audio module 1680 may process voice information input or output through a speaker 1682, a receiver 1684, earphones 1686 or a microphone 1688.

The image sensor module 1691 is a device for photographing still and moving images, and, according to an embodiment of the present disclosure, the image sensor module may include at least one image sensor (e.g., a front sensor or a rear sensor), lenses (not shown), an image signal processor (ISP) (not shown), or a flash (e.g., LED or a xenon lamp) (not shown).

The power control module 1695 may manage power of the electronic device 1601. Although it is not shown in the drawing, the power management module 1695 may include, for example, a power management integrated circuit (PMIC), a charger integrated circuit (IC), or a battery or fuel gauge.

The PMIC may be mounted, for example, in an integrated circuit or an SoC semiconductor. The charging may be conducted in a wired type and a wireless type. The charger IC may charge a battery, and may prevent inflow of an excessive voltage or current from a charger. According to an embodiment of the present disclosure, the charger IC may include a charger IC for at least one of the wired charging type or the wireless charging type. The wireless charging type may encompass, for example, a magnetic resonance type, a magnetic induction type, or an electromagnetic wave type, and additional circuits for wireless charging, for example, coil loops, resonance circuits, rectifiers, or the like, may be provided.

The battery gauge may measure, for example, the remaining power of the battery 1696, a charging voltage and current, or temperature. The battery 1696 may store or generate electric power, and supply power to the electronic device 1601 by using the stored or generated electric power. The battery 1696 may include, for example, a rechargeable battery or a solar battery.

The indicator 1697 may display a specific state, for example, a booting state, a message state, or a charging state of the whole of or a part (e.g., the AP 1610) of the electronic device 1601. The motor 1698 may convert an electric signal to a mechanical vibration. Although it is not shown in the drawing, the electronic device 1601 may include a processing device (e.g., the GPU) for supporting mobile TV. The processing device for supporting mobile TV may process media data according to the standard such as, for example, digital multimedia broadcasting (DMB), digital video broadcasting (DVB) or media flow.

The electronic device and the method, according to various embodiments of the present disclosure, for example, may provide a locking service, based on at least one of a touch area, a touch shape, or the number of touches to thereby satisfy various desires of users and to protect the user's personal information stored in the electronic device from others.

The term "module" as used herein may, for example, describe a unit including one of hardware, software, and firmware or a combination of two or more of them. The "module" may be interchangeably used with, for example, the term "unit", "logic", "logical block", "component", "circuit," and the like. The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

According to various embodiments of the present disclosure, at least some of the devices (e.g., modules or functions thereof) or the method (e.g., operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

Certain aspects of the present disclosure may also be embodied as computer readable code on a non-transitory computer readable recording medium. A non-transitory computer readable recording medium is any data storage device that may store data which may be thereafter read by a computer system. Examples of the non-transitory computer readable recording medium include a ROM, a RAM, Compact Disc-ROMs (CD-ROMs), magnetic tapes, floppy disks, and optical data storage devices. The non-transitory computer readable recording medium may also be distributed over network coupled computer systems so that the computer readable code is stored and executed in a distributed fashion. In addition, functional programs, code, and code segments for accomplishing the present disclosure may be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums may also be distributed over network coupled computer systems so that the instructions are stored and executed in a distributed fashion. In addition, functional computer programs, instructions, and instruction segments for accomplishing the present disclosure may be easily construed by programmers skilled in the art to which the present disclosure pertains.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added. Further, various embodiments disclosed in this document are only for the description and understanding of technical contents and do not limit the scope of the present disclosure. Accordingly, the scope of the present disclosure should be construed as including all modifications or various other embodiments based on the technical idea of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a touch screen; and
    a processor configured to:
        in response to receiving, in the touch screen, a touch input unrelated to an input of an alphanumeric symbol, display at least one alphanumeric symbol indicating at least one touch property of the touch input, wherein the at least one touch property is at least one of a touch size, a touch shape, a touch movement, or a number of touches associated with the touch input, and
        based on the at least one alphanumeric symbol, generate a reference pattern for unlocking the electronic device.

2. The electronic device of claim 1, wherein the processor is further configured to:
    when the touch input is a multi-touch input, detect a plurality of touch regions of the multi-touch input,
    determine a touch size and a touch shape for each of the plurality of touch regions, and
    display, based on at least one of the determined touch size for each of the plurality of touch regions, the touch shape for each of the plurality of touch regions, and the number of the touch regions, the at least one alphanumeric symbol being associated with the multi-touch input.

3. The electronic device of claim 1,
    wherein the processor is further configured to create at least one haptic effect associated with the at least one touch property of the touch input.

4. The electronic device of claim 1, wherein the processor is further configured to:
    receive a sequence of touch inputs, and
    based on the received sequence of the touch inputs, generate a user input pattern,
    when the user input pattern matches the reference pattern, unlock the electronic device.

5. The electronic device of claim 4, wherein the processor is further configured to:
    when the user input pattern does not match the reference pattern, maintain the electronic device in a locked state.

6. An electronic device comprising:
    a touch screen; and
    a processor configured to:
        detect a first set of touch inputs and a second set of touch inputs in a touch region of the touch screen,
        determine a first average touch size of the first set of touch inputs and a second average touch size of the second set of touch inputs,
        determine a first reference touch size based on the first average touch size and determine a second reference touch size based on the second average touch size, wherein the first reference touch size is larger than the second reference touch size,
        in response to receiving, in the touch screen, a touch input unrelated to an input of an alphanumeric symbol, determine a touch size associated with the touch input,
        when the determined touch size is larger than the first reference touch size, display a first alphanumeric symbol indicating that the determined touch size is larger than the first reference touch size, when the determined touch size is smaller than the second reference touch size, display a second alphanumeric symbol indicating that the determined touch size is smaller than the second reference touch size, and based on the first alphanumeric symbol or the second alphanumeric symbol, generate a reference pattern for unlocking the electronic device.

7. The electronic device of claim 6, wherein the processor is further configured to:

receive a sequence of touch inputs, generate a user input pattern by comparing a touch size of each of the sequence of the touch inputs with at least one of the first reference touch size and the second reference touch size, when the user input pattern matches the reference pattern, unlock the electronic device, and when the user input pattern does not match the reference pattern, maintain the electronic device in a locked state.

8. An operating method of an electronic device, the method comprising:

in response to receiving, in a touch screen of the electronic device, a touch input unrelated to an input of an alphanumeric symbol, displaying at least one alphanumeric symbol indicating at least one touch property of the touch input, wherein the at least one touch property is at least one of a touch size, a touch shape, a touch movement, or a number of touches associated with the touch input; and based on the at least one alphanumeric symbol, generating a reference pattern for unlocking the electronic device.

9. The method of claim 8, further comprising:

when the touch input is a multi-touch input, detecting a plurality of touch regions of the multi-touch input;

determining a touch size and a touch shape for each of the plurality of touch regions; and displaying, based on at least one of the determined touch size for each of the plurality of touch regions, the touch shape for each of the plurality of touch regions, and the number of the touch regions, the at least one alphanumeric symbol being associated with the multi-touch input.

10. The method of claim 8, further comprising creating at least one of a haptic effect associated with the at least one touch property of the touch input.

11. The method of claim 8, further comprising:

receiving a sequence of touch inputs;

based on the received sequence of the touch inputs, generating a user input pattern; and when the user input pattern matches the reference pattern, unlocking the electronic device.

12. The method of claim 11, further comprising, when the user input pattern does not match the reference pattern, maintaining the electronic device in a locked state.

13. An operating method of an electronic device, the method comprising:

detecting a first set of touch inputs and a second set of touch inputs in a touch region of a touch screen of the electronic device;

determining a first average touch size of the first set of touch inputs and a second average touch size of the second set of touch inputs;

determining a first reference touch size based on the first average touch size and determining a second reference touch size based on the second average touch size, wherein the first reference touch size is larger than the second reference touch size;

in response to receiving, in the touch screen, a touch input unrelated to an input of an alphanumeric symbol, determining a touch size associated with the touch input;

when the determined touch size is larger than the first reference touch size, displaying a first alphanumeric symbol indicating that the determined touch size is larger than the first reference touch size;

when the determined touch size is smaller than the second reference touch size, displaying a second alphanumeric symbol indicating that the determined touch size is smaller than the second reference touch size; and based on the first alphanumeric symbol or the second alphanumeric symbol, generating a reference pattern for unlocking the electronic device.

14. The method of claim 13, further comprising:

receiving a sequence of touch inputs;

generating a user input pattern by comparing a touch size of each of the sequence of the touch inputs with at least one of the first reference touch size and the second reference touch size;

when the user input pattern matches the reference pattern, unlocking the electronic device; and when the user input pattern does not match the reference pattern, maintaining the electronic device in a locked state.

* * * * *